(12) United States Patent
Nishihara et al.

(10) Patent No.: US 10,852,183 B2
(45) Date of Patent: Dec. 1, 2020

(54) OPTICAL PULSE DETECTION DEVICE, OPTICAL PULSE DETECTION METHOD, RADIATION COUNTER DEVICE, AND BIOLOGICAL TESTING DEVICE

(71) Applicant: Sony Semiconductors Solutions Corporation, Kanagawa (JP)

(72) Inventors: Toshiyuki Nishihara, Kanagawa (JP); Keniichi Okumura, Tokyo (JP)

(73) Assignee: Sony Semiconductors Solutions Corporation, Kanagawa (JP)

( * ) Notice: Subject to any disclaimer, the term of this patent is extended or adjusted under 35 U.S.C. 154(b) by 141 days.

(21) Appl. No.: 15/775,600

(22) PCT Filed: Nov. 4, 2016

(86) PCT No.: PCT/JP2016/082739
§ 371 (c)(1),
(2) Date: May 11, 2018

(87) PCT Pub. No.: WO2017/086181
PCT Pub. Date: May 26, 2017

(65) Prior Publication Data
US 2018/0328783 A1 Nov. 15, 2018

(30) Foreign Application Priority Data

Nov. 19, 2015 (JP) .................................. 2015-226790
Sep. 5, 2016 (JP) .................................. 2016-172925

(51) Int. Cl.
*G01J 1/44* (2006.01)
*H04N 5/32* (2006.01)
(Continued)

(52) U.S. Cl.
CPC .................................... *G01J 1/44* (2013.01); *G01T 1/15* (2013.01); *G01T 1/208* (2013.01); *G01T 1/2018* (2013.01);
(Continued)

(58) Field of Classification Search
CPC . G01J 1/44; G01T 1/15; G01T 1/2018; G01T 1/208; G01T 1/24; H04N 5/32; H04N 5/3745; H04N 5/37455; H04N 5/378
See application file for complete search history.

(56) References Cited

U.S. PATENT DOCUMENTS

2008/0099689 A1* 5/2008 Nygard ................. G01T 1/2018
                                                        250/370.09
2010/0074396 A1* 3/2010 Schmand ............... A61B 6/032
                                                        378/19
(Continued)

FOREIGN PATENT DOCUMENTS

EP     2 840 777 A1    2/2015
EP     2 876 464 A1    5/2015
(Continued)

OTHER PUBLICATIONS

Ohara, JP 2003-172783 A, cited in IDS dated Aug. 23, 2019, English Translation obtained from Google Patents on Nov. 29, 2019 (Year: 2019).*
(Continued)

*Primary Examiner* — David P Porta
*Assistant Examiner* — Jeremy S Valentiner
(74) *Attorney, Agent, or Firm* — Wolf, Greenfield & Sacks, P.C.

(57) ABSTRACT

The present technology relates to an optical pulse detection device, an optical pulse detection method, a radiation counter device, and a biological testing device which are capable of performing radiation counting in a more accurate manner.
(Continued)

The optical pulse detection device includes a pixel array unit in which a plurality of pixels are arranged in a two-dimensional lattice shape, an AD converter that converts output signals of each of the pixels in the pixel array unit into digital values with gradation greater than 1 bit, and an output control circuit that performs error determination processing of comparing the digital value with a predetermined threshold value, and discarding a digital value, which is greater than the threshold value, among the digital values as an error. For example, the present technology is applicable to a radiation counter device, and the like.

18 Claims, 30 Drawing Sheets

(51) Int. Cl.
   *G01T 1/24* (2006.01)
   *G01T 1/20* (2006.01)
   *G01T 1/208* (2006.01)
   *H04N 5/3745* (2011.01)
   *H04N 5/378* (2011.01)
   *G01T 1/15* (2006.01)

(52) U.S. Cl.
   CPC ................ *G01T 1/24* (2013.01); *H04N 5/32* (2013.01); *H04N 5/378* (2013.01); *H04N 5/3745* (2013.01); *H04N 5/37455* (2013.01); *G01J 2001/442* (2013.01); *G01J 2001/4466* (2013.01)

(56) References Cited

U.S. PATENT DOCUMENTS

| | | | | |
|---|---|---|---|---|
| 2013/0038785 | A1* | 2/2013 | Song | H04N 5/2353 348/362 |
| 2013/0088620 | A1* | 4/2013 | Centen | G01S 7/4863 348/273 |
| 2013/0105871 | A1 | 5/2013 | Inui | |
| 2014/0021354 | A1 | 1/2014 | Gagnon et al. | |
| 2015/0115163 | A1 | 4/2015 | Nishihara et al. | |
| 2016/0216381 | A1 | 7/2016 | Nishihara et al. | |
| 2016/0219234 | A1* | 7/2016 | Nishihara | H04N 5/378 |
| 2016/0241795 | A1 | 8/2016 | Nishihara | |

FOREIGN PATENT DOCUMENTS

| | | | |
|---|---|---|---|
| JP | 2003-172783 A | 6/2003 | |
| JP | 2012-015400 A | 1/2012 | |
| JP | 2012-163464 A | 8/2012 | |
| JP | 2014-021123 A | 2/2014 | |
| JP | 2014-139564 A | 7/2014 | |
| JP | 2015-076773 A | 4/2015 | |
| JP | 2015-121505 A | 7/2015 | |
| WO | WO 2012/001939 A1 | 1/2012 | |
| WO | WO 2013/157448 A1 | 10/2013 | |
| WO | WO 2014/097546 A1 | 6/2014 | |
| WO | WO-2014097546 A1 * | 6/2014 | ........... G01T 1/2018 |
| WO | WO-2014097857 A1 * | 6/2014 | ............ H04N 3/155 |
| WO | WO 2015/052864 A1 | 4/2015 | |

OTHER PUBLICATIONS

International Search Report and Written Opinion and English translation thereof dated Jan. 24, 2017, in connection with International Application No. PCT/JP2016/082739.

International Preliminary Report on Patentability and English translation thereof dated May 31, 2018 in connection with International Application No. PCT/JP2016/082739.

\* cited by examiner

FIG. 4
ONE PHOTON SIGNAL
CORRESPONDS TO 10LSB
| −14 | 24 | 13 | 0  | 26 |
|-----|----|----|----|----|
| 6   | 17 | 4  | 26 | 33 |
| 3   | 6  | 6  | 11 | 5  |
| 21  | 9  | 1  | 7  | 10 |
| 29  | 26 | −3 | −3 | 7  |
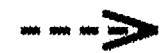

|  | Tc 99m | Cs 137 | K 40 |
|---|---|---|---|
| ENERGY [keV] | 140 | 662 | 1460 |
| NUMBER OF EFFECTIVE INCIDENT PHOTONS N | 4,144 | 19,595 | 43,216 |
| AVERAGE PIXEL SIGNAL $\lambda s$ [e-/pixel] | 0.104 | 0.490 | 1.080 |
| 99.999% EXISTENCE THRESHOLD VALUE [e-] | 3 | 6 | 8 |

FIG. 7

|  | Tc 99m | Cs 137 | K 40 |
|---|---|---|---|
| ENERGY [keV] | 140 | 662 | 1460 |
| NUMBER OF EFFECTIVE INCIDENT PHOTONS N | 4,144 | 19,595 | 43,216 |
| PIXEL READ-OUT NOISE $\sigma n$ [e- rms] | 0.5 | | |
| ENERGY RESOLUTION Rp [FULL WIDTH AT HALF MAXIMUM %] | 6.7 | 2.1 | 1.3 |

OPTICAL PULSE DETECTION DEVICE, OPTICAL PULSE DETECTION METHOD, RADIATION COUNTER DEVICE, AND BIOLOGICAL TESTING DEVICE

CROSS-REFERENCE TO RELATED APPLICATIONS

This application claims the benefit under 35 U.S.C. § 371 as a U.S. National Stage Entry of International Application No. PCT/JP2016/082739, filed in the Japanese Patent Office as a Receiving Office on Nov. 4, 2016, which claims priority to Japanese Patent Application Number JP2016-172925, filed in the Japanese Patent Office on Sep. 5, 2016 and Japanese Patent Application Number JP2015-226790, filed in the Japanese Patent Office on Nov. 19, 2015, each of which is hereby incorporated by reference in its entirety.

TECHNICAL FIELD

The present technology relates to an optical pulse detection device, an optical pulse detection method, a radiation counter device, and a biological testing device, and more particularly to, an optical pulse detection device, an optical pulse detection method, a radiation counter device, and a biological testing device which are capable of performing radiation counting in a more accurate manner.

BACKGROUND ART

A radiation counter (photon count), which counts a dose of radiation that is incident to a detector while performing individual energy separation in an incident photon unit, is applied to various fields such as a survey meter and a gamma camera. As the detector, typically, a scintillator and a photomultiplier tube are used. The radiation counter counts energy and the number of rays of radiation that is incident to the detector. When one or more photons of radiation are incident to the scintillator, the scintillator emits light, and releases a pulse of visible light having the quantity of light that is proportional to the energy of radiation. The light-emission pulse is generated whenever a radiation photon is incident, and is detected by the photomultiplier tube. Here, the scintillator is covered with a partition wall in which only a surface that faces the photomultiplier tube is in an open state. The partition wall shields intrusion of visible light from an outer side, and reflects light generated from an inner side to allow the entirety of light to be incident to the photomultiplier tube.

In the radiation counter, the photomultiplier tube converts the light-emission pulse into an electron, and amplifies the electron to generate an analog electrical pulse. A pulse height of the analog electrical pulse is proportional to the quantity of light-emission of the scintillator, that is, energy of the radiation. In addition, whenever one radiation photon is incident, an independent pulse is output, and thus the radiation counter can obtain the number of radiation photons which are incident by counting the number of pulses.

A detection circuit in the radiation counter amplifies and shapes a pulse that is generated to convert the pulse into an analog wave having appropriate delay, and converts the analog wave into a digital value by an AD converter. According to this, the radiation counter can derive energy for each of incident radiation photons as a digital value. A digital processing circuit in the radiation counter integrates output results of the detection circuit in a predetermined period, and derives an energy spectrum of the radiation photons. The energy spectrum represents an existence ratio of the radiation photons, which are counted by the radiation counter, per energy. According to this, the radiation counter can specify a radiation source. In addition, it is possible to discriminate radiation that is directly incident from the radiation source, and radiation that is scattered on the way.

As described above, in photon counting of radiation, the scintillator and the photomultiplier tube are mainly used. However, the photomultiplier tube is expensive and is not appropriate for reduction in size and weight. In addition, the photomultiplier tube is susceptible to a magnetic field. Accordingly, a configuration in which an avalanche photodiode (APD) or silicon photomultipliers (SiPM) array is used (for example, refer to Patent Documents 1 and 2) instead of the photomultiplier tube is also suggested.

CITATION LIST

Patent Document

Patent Document 1: Japanese Patent Application Laid-Open No. 2009-25308
Patent Document 2: PCT Japanese Translation Patent Publication No. 2011-515676

SUMMARY OF THE INVENTION

Problems to be Solved by the Invention

However, in a configuration using the APD array, an output signal is very weak, and thus an output fluctuation due to a temperature is significant, and it is susceptible to an external environment. In addition, in a configuration using the SiPM array, a high electric field is necessary, and thus a dark current is large, and floor noise is great due to an after pulse, crosstalk, and the like. In addition, since a high voltage is used in any one of the configurations of APD and SiPM, an additional power supply circuit is necessary and an output is an analog signal. According to this, it is necessary to additionally mount an amplifier, an integration circuit, and an AD conversion circuit on an outer side, and it is susceptible to an external noise during signal transfer.

In addition, in the radiation counting using scintillation as described above, a plurality of error factors exist. A principal one of the error factors is an excessive signal that occurs in a case where radiation, which is transmitted through the scintillator, is directly incident to the detector. In addition, in APD, SiPM, and the like, a silicon crystal is fractured due to an influence of X-rays, and thus a dark current becomes weak with the passage of time or a defective pixel may occur, The present technology has been made in consideration of the above-described circumstances, and an object thereof is to realize more accurate radiation counting.

Solution to Problems

An optical pulse detection device according to a first aspect of the present technology includes: a pixel array unit in which a plurality of pixels are arranged in a two-dimensional lattice shape; an AD converter that converts output signals of each of the pixels in the pixel array unit into digital values with gradation greater than 1 bit; and a control circuit that performs error determination processing of comparing the digital value with a first threshold value, and discarding a digital value, which is greater than the first threshold value, among the digital values as an error.

There is provided an optical pulse detection method according to a second aspect of the present technology in which an optical pulse detection device includes a pixel array unit in which a plurality of pixels are arranged in a two-dimensional lattice shape, an AD converter that converts output signals of each of the pixels in the pixel array unit into digital values with gradation greater than 1 bit, and a control circuit that performs error determination processing of comparing the digital value with a predetermined threshold value, and discarding a digital value, which is greater than the threshold value, among the digital values as an error, and the method includes: converting output signals of each of the pixels in the pixel array unit into digital values with gradation greater than 1 bit; and performing error determination processing of comparing the digital value with the predetermined threshold value, and discarding a digital value, which is greater than the threshold value, among the digital values as an error.

According to the first and second aspects of the present technology, the error determination processing, in which output signals of each of the pixels in the pixel array unit are converted into digital values with gradation greater than 1 bit, the converted digital values are compared with a predetermined threshold value, and a digital value, which is greater than the threshold value, among the digital values is discarded as an error, is performed.

According to a third aspect of the present technology, there is provided a radiation counter device including the optical pulse detection device and the scintillator according to the first aspect. The optical pulse detection device detects a light-emission pulse when radiation is incident to the scintillator and emits light.

According to the third aspect of the present technology, the light-emission pulse when the radiation is incident to the scintillator and emits light is detected by the optical pulse detection device according to the first aspect.

According to a fourth aspect of the present technology, there is provided a biological testing device including the optical pulse detection device according to the first aspect. The optical pulse detection device detects fluorescence or scattered light which is excited when a specimen in a fluid is irradiated with laser light.

According to the fourth aspect of the present technology, the fluorescence or scattered light, which is excited when a specimen in a fluid is irradiated with laser light, is detected by the optical pulse detection device according to the first aspect.

The optical pulse detection device, the radiation counter device, and the biological testing device may be independent devices or internal blocks which constitute one device.

Effects of the Invention

According to the first to fourth aspects of the present technology, it is possible to detect weak pulse light in a more accurate manner.

In addition, according to the first to third aspects of the present technology, it is possible to perform radiation counting in a more accurate manner.

Furthermore, the effect described here is not limited, and may be any one effect described in the present disclosure.

BRIEF DESCRIPTION OF DRAWINGS

FIG. 4 is a view illustrating an example of digital values output from respective pixels.

FIG. 7 is a view illustrating energy resolution of three kinds of radioactive substances.

MODE FOR CARRYING OUT THE INVENTION

Hereinafter, a mode (hereinafter, referred to as "embodiment") for carrying out the present technology will be described. Furthermore, description will be made in the following order.

1. First Embodiment of Radiation Counter Device (configuration example in which one scintillator is disposed with respect to an optical detector)
2. Second Embodiment of Radiation Counter Device (configuration example in which a plurality of the scintillators are disposed with respect to the optical detector)
3. Semiconductor Substrate Structure Example of Optical Detector
4. Another Configuration Example of Pixel Circuit
5. Another Application Example of Optical Detector 1. First Embodiment <1.1 Configuration Example of Radiation Counter Device>

Figure 1:
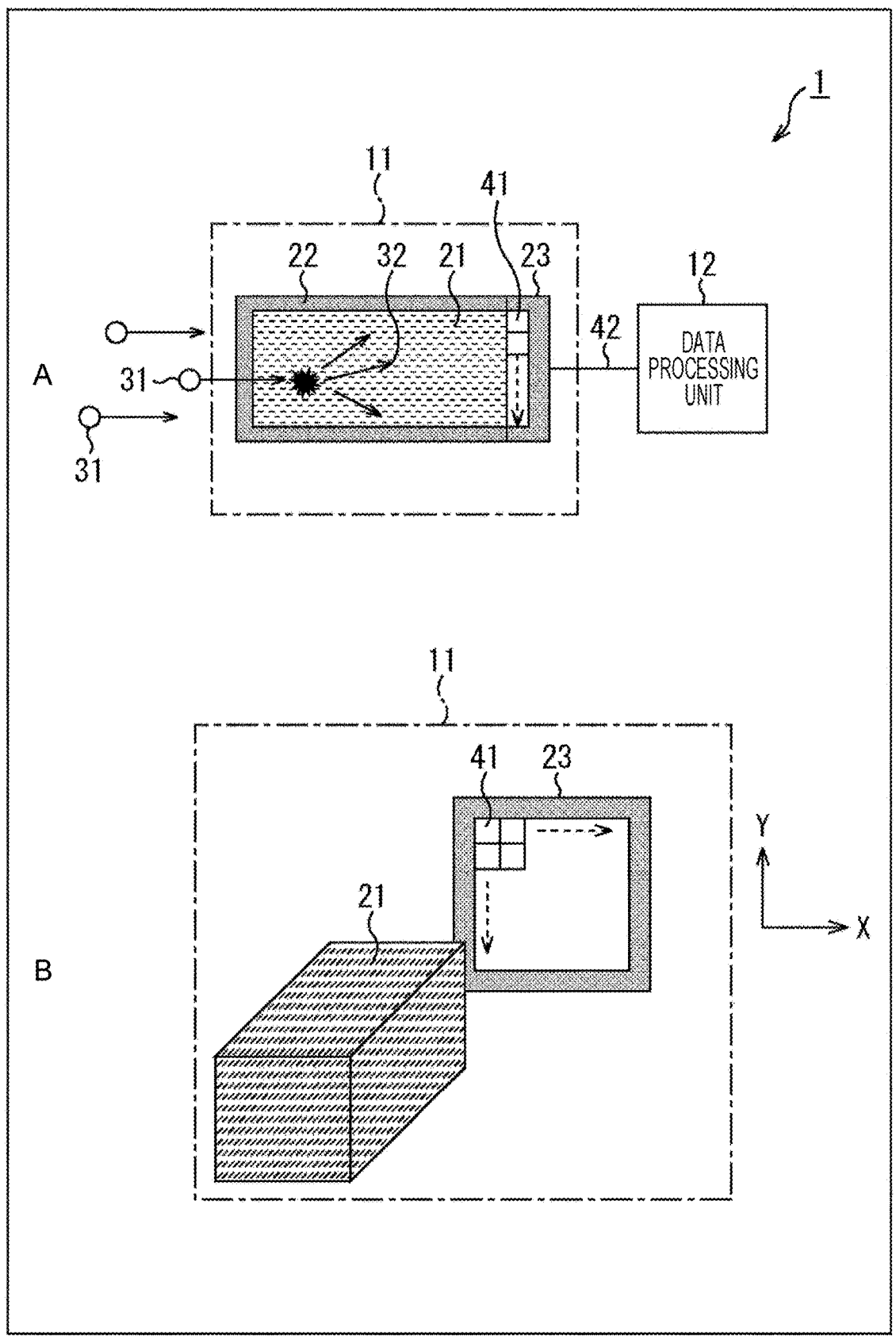
FIG. 1 is a view illustrating a configuration example of a first embodiment of a radiation counter device to which the present technology is applied.

FIG. 1 illustrates a configuration example of a first embodiment of a radiation counter device to which the present technology is applied.

A radiation counter device 1 illustrated in FIG. 1 includes a light-receiving unit 11 and a data processing unit 12. The light-receiving unit 11 includes a scintillator 21, a partition wall 22, and an optical detector 23.

A of FIG. 1 illustrates a cross-sectional view of the scintillator 21, the partition wall 22, and the optical detector 23 of the light-receiving unit 11, and B of FIG. 1 illustrates a perspective view of the scintillator 21 and the optical detector 23 of the light-receiving unit 11.

When radiation 31 is incident to the scintillator 21, the scintillator 21 generates photons 32. For example, the scintillator 21 includes sodium iodide (NaI), and the size of a surface facing the optical detector 23 is processed into a rectangular parallelepiped shape of 4 mm square.

The scintillator 21 is covered with the partition wall 22 that shields visible light. However, in the partition wall 22, only a surface, which faces the optical detector 23 in a state of being close thereto, is opened. It is preferable that the partition wall 22 is constituted by a radioactive substance (for example, aluminum) that reflects light. According to this, it is possible to allow the majority of the photons 32, which occur by the scintillator 21, to be incident to the optical detector 23.

The optical detector 23 detects light and generates a digital signal. The optical detector 23 includes a light-receiving surface that faces the scintillator 21, and a plurality of pixels 41 are arranged on the light-receiving surface in a two-dimensional lattice shape. In this embodiment, it is assumed that 40,000 pieces of pixels 41 of 200 (X direction (horizontal direction))×200 (Y direction (vertical direction)) are arranged. Details of the pixels 41 will be described later. The optical detector 23 supplies the digital signal, which is generated, to the data processing unit 12 through a signal line Furthermore, it is preferable that the scintillator 21 and the optical detector 23 are bonded to each other with an optical adhesive having an appropriate refractive index. Alternatively, a light guide such as fiber glass may be interposed between the scintillator 21 and the optical detector 23.

The data processing unit 12 processes the digital signal supplied from the optical detector 23 to perform radiation counting. In addition, the data processing unit 12 derives the quantity of light of a light-emission pulse, and performs energy determination of the incident radiation (specifying of a radiation source based on energy).

For example, the data processing unit 12 can be constructed by a computer including a central processing unit (CPU), a read only memory (ROM), a random access memory (RAM), and the like. The data processing unit 12 can execute various kinds of signal processing to be described later by reading out a program, which is stored in the ROM, a semiconductor memory, and the like, and by executing the program in the CPU.

The radiation counter device 1 may have a configuration of a radiation counter device such as gamma camera having spatial resolution by tiling a set of the scintillator 21 and the optical detector 23 in an X-Y direction (by arranging a plurality of the sets in an array shape).

<1.2 Configuration Example of Optical Detector>

Figure 2:
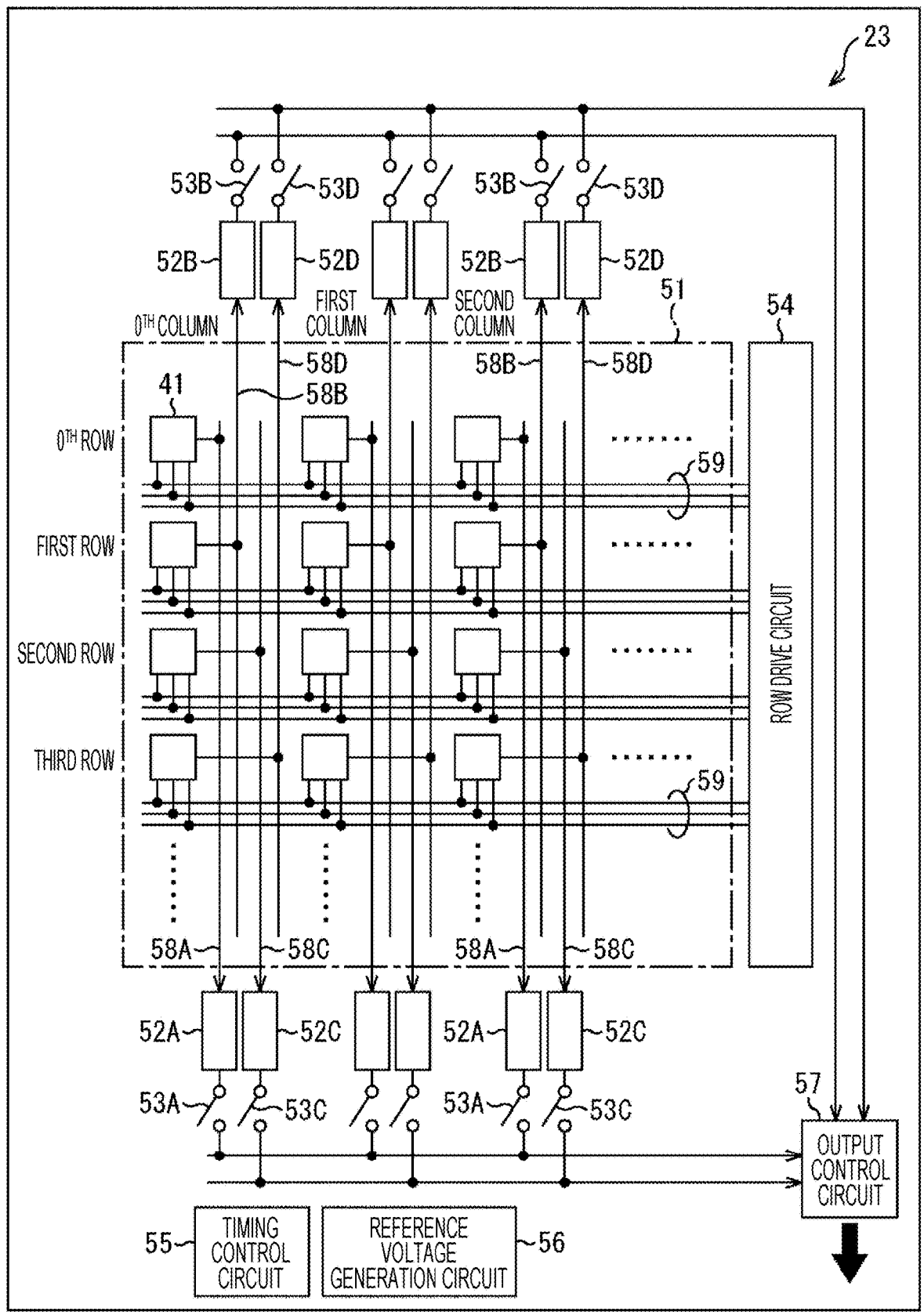
FIG. 2 is a view illustrating a circuit configuration of an optical detector.

FIG. 2 illustrates a circuit configuration of the optical detector 23.

The optical detector 23 includes a pixel array unit 51, a detection circuit 52, a switch 53, a row drive circuit 54, a timing control circuit 55, a reference voltage generation circuit 56, an output control circuit 57, and the like. For example, respective circuits, which constitute the optical detector 23, are provided in one chip.

A plurality of the pixels 41 are arranged in the pixel array unit 51 in a two-dimensional lattice shape. Hereinafter, a predetermined direction (X direction in FIG. 1) in which the plurality of pixels 41 are arranged is referred to a row direction, and a direction (Y direction in FIG. 1) perpendicular to the row direction is referred to as a column direction.

Four detection circuits 52 and four switches 53 are provided with respect to one row of pixels 41 in the pixel array unit 51, and are illustrated as detection circuits 52A to 52D, and switches 53A to 53D in FIG. 2. For example, with respect to a $0^{th}$ column of the pixel array unit 51, the pixel 41 in a $0^{th}$ row is connected to the detection circuit 52A and the switch 53A through a vertical signal line 58A, and the pixel 41 in a first row is connected to the detection circuit 52B and the switch 53B through a vertical signal line 58B. The pixel 41 in a second row is connected to the detection circuit 52C and the switch 53C through a vertical signal line 58C, and the pixel 41 in a third row is connected to the detection circuit 52D and the switch 53D through a vertical signal line 58D. Hereinafter, similarly, the pixels 41 in a fourth row, an eighth row, . . . are connected to the detection circuit 52A and the switch 53A, the pixels 41 in a fifth row, a ninth row, . . . are connected to the detection circuit 52B and the switch 53B, the pixels 41 in a sixth row, a tenth row, . . . are connected to the detection circuit 52C and the switch 53C, and the pixels 41 in a seventh row, an eleventh row, . . . are connected to the detection circuit 52D and the switch 53D. This configuration is also true of the other pixel columns. In addition, the respective pixels 41 of the pixel array unit 51 are also connected to the row drive circuit 54 through control lines 59.

The detection circuit 52 converts analog electric signals, which are supplied from the pixels 41 in the pixel array unit 51, into digital signals in accordance with a control of the timing control circuit 55, and supplies the digital signals to the switches 53.

The switches 53 open and close a path between the detection circuit 52 and the output control circuit 57 which are connection destinations. Four switches 53, which are disposed in each of the columns, conform to a control of a column drive circuit (not illustrated in the drawing) that sequentially selects respective columns, and supply digital signals, which are retained in the detection circuit 52 that is a connection destination, to the output control circuit 57.

The row drive circuit 54 controls driving of the pixels 41 in accordance with a control of the timing control circuit 55. As described above, in the pixel array unit 51, the four detection circuits 52A to 52D and the switches 53A to 53D are provided with respect to one row of the pixels 41 which are arranged in a matrix shape. According to this, the row drive circuit 54 can simultaneously select four adjacent rows for exposure to generate analog electrical signals. The electrical signals, which are generated in the four rows of pixels 41 which are simultaneously selected, are read out by the detection circuits 52A to 52D, and are converted into digital signals. When the read-out is completed, the row drive circuit 54 performs a similar control with respect to the subsequent four rows. That is, the detection circuits 52A to 52D read out digital signals in a four-row unit in a column direction, and when read-out for the entirety of rows in the pixel array unit 51 is completed, image data corresponding to one frame, that is, a unit of optical pulse detection is output. In this embodiment, in a case of assuming that the pixel array unit 51 includes 40,000 pixels of 200×200, and 16 microseconds (μs) are necessary for processing of four rows, 50 times of processing are necessary for read-out and output of one frame, and thus approximately 0.8 milliseconds (ms) are necessary.

The timing control circuit 55 controls operation timing of the detection circuit 52, the row drive circuit 54, the reference voltage generation circuit 56, and the like. For example, the timing control circuit 55 generates a timing control signal indicating row scanning timing, and supplies the timing control signal to the row drive circuit 54. In addition, the timing control circuit 55 generates a digital to analog (DAC) control signal for controlling a reference voltage supply operation, and supplies the DAC control signal to the reference voltage generation circuit 56. In addition, the timing control circuit 55 supplies a detection control signal for controlling the operation of the detection circuits 52 to the detection circuits 52.

The reference voltage generation circuit 56 generates a reference voltage Vref in accordance with the DAC control signal, and supplies the reference voltage Vref to each of the detection circuits 52. The detection circuit 52 compares analog pixel signal (voltages thereof) supplied from the pixels 41 with the reference voltage Vref, and converts the analog pixel signals into digital signals.

The output control circuit 57 outputs the digital signals to the data processing unit 12 on a rear stage (FIG. 1). Details of the output control circuit 57 will be described later. The output control circuit 57 executes error determination processing with respect to a digital value corresponding to an optical pulse that is detected in each of the pixels 41 of the pixel array unit 51, and outputs image data after removal and correction of error data.

<1.3 Circuit Configuration of Pixels>

Next, a circuit configuration of the pixels 41 will be described with reference to FIG. 3.

Each of the pixels 41 includes a photodiode 71, an accumulation node 72, a transfer transistor 73, an amplification transistor 74, a reset transistor 75, a detection node 76, and a selection transistor 77. As the transfer transistor 73, the amplification transistor 74, the reset transistor 75, and the selection transistor 77, for example, an n-type metal oxide semiconductor (MOS) transistor can be used.

The photodiode 71 is a photoelectric conversion element that converts a photon into a charge. The photodiode 71 is connected to the transfer transistor 73 through the accumulation node 72. The photodiode 71 generates a pair of an electron and a hole from a photon that is incident to a silicon substrate in which a circuit of the pixel 41 is formed, and accumulates the electron in the accumulation node 72.

The transfer transistor 73 transfers the charge from the accumulation node 72 to the detection node 76 in accordance with a control of the row drive circuit 54. The detection node 76 accumulates the charge transferred from the transfer transistor 73, and generates an analog voltage corresponding to the amount of charges accumulated. The voltage is applied to a gate of the amplification transistor 74.

The reset transistor 75 takes out charges accumulated in the accumulation node 72 or the detection node 76 to a power supply VDD for initialization (reset). In the reset transistor 75, a gate is connected to the row drive circuit 54, a drain is connected to the power supply VDD, and a source is connected to the detection node 76.

For example, the row drive circuit 54 controls the reset transistor 75 to be an ON-state simultaneously with the transfer transistor 73 to take out electrons accumulated in the accumulation node 72 to the power supply VDD, and to initialize the pixel 41 into a dark state before accumulation, that is, a state in which light is not incident. In addition, the row drive circuit 54 controls only the reset transistor 75 to be an ON-state to take out charges accumulated in the detection node 76 to the power supply VDD and to initialize the amount of charges.

The amplification transistor 74 amplifies a voltage of agate. In the amplification transistor 74, the gate is connected to the detection node 76, a drain is connected to the power supply VDD, and a source is connected to the selection transistor 77. The amplification transistor 74 constitutes a source follower in combination with a constant current circuit 78 that is connected thereto through a vertical signal line 58, and a voltage of the detection node 76 is output to the vertical signal line 58 in a gain less than 1. An electrical signal of the voltage is acquired by the detection circuit 52 including an AD converter 91.

The selection transistor 77 outputs an electrical signal in accordance with a control of the row drive circuit 54. In the selection transistor 77, agate is connected to the row drive circuit 54, a drain is connected to the amplification transistor 74, and a source is connected to the vertical signal line 58.

In a period before read-out is performed after the photodiode 71 is reset, the pixel 41 accumulates photo-electrically converted charges at the inside thereof, and outputs a signal corresponding to accumulated charges at the time of read-out. The pixel 41 repetitively executes accumulation and read-out in the unit period. When optical pulse is incident during accumulation, the pixel 41 can obtain the result at the time of read-out.

As the type of the photodiode 71, an embedded type photodiode, which is completely depleted at the time of charge discharge due to reset, is preferable. The embedded type photodiode 71 has characteristics in which the detection node 76 and the accumulation node 72 of the photodiode 71 are not capacitively coupled at the time of read-out. As a result, conversion efficiency is improved in proportional to a reduction in parasitic capacitance of the detection node 76, and it is possible to improve sensitivity with respect to incidence of one photon. In addition, the size of the photodiode 71 increases, conversion efficiency does not deteriorate. Accordingly, the further the size of the photodiode 71 increases, the further sensitivity per pixel with respect to the same luminous flux density is improved. On the other hand, a similar property is also observed in a MOS type photoelectric conversion element.

The pixel 41 having the above-described configuration is not accompanied with electronic multiplication, for example, as in APD, SiPM, and a high electron multiplier tube. Accordingly, an output of the pixel 41 is influenced by read-out noise that is caused by the amplification transistor 74 or the AD converter 91 in the detection circuit 52, but when pixel sensitivity is maximized by using the above-described properties, it is possible to relatively minimize the influence of the noise. That is, when the parasitic capacitance of the detection node 76 is reduced as much as possible, and the size of the photodiode 71 is increased in a range capable of realizing transfer of one electron, an SN ratio of the pixel 41 is maximized, and thus it is possible to realize the pixel 41 as a high-sensitivity detector.

<Example of Pixel Output>

The radiation counter device 1 measures weak light-emission pulse including, for example, several thousands of photons 32 which occur when, for example, one ray of radiation 31 is photo-electrically absorbed to the scintillator 21. The optical detector 23 receives a weak light-emission pulse, which is object to be measured, by the pixel array unit 51 including a plurality of the pixels 41, and generates an independent output in correspondence with the quantity of light received by each of the pixels 41. The output of the pixel 41 is converted into a digital value with gradation greater than 1 bit by the AD converter 91. In addition, the pixel 41 can detect a plurality of photons.

In a case where weak pulse light is received by the pixel array unit 51 of the optical detector 23, the weak pulse light is received in a state of being approximately uniformly and randomly dispersed to the pixels 41. Accordingly, even in a case where the weak pulse light is received, outputs of the pixels become approximately uniform.

FIG. 4 illustrates an example of digital values after electrical signals output from each of the pixels 41 are AD-converted by the AD converter 91.

In this embodiment, the AD converter 91 performs output after conversion into a digital value with gradation so that one photon signal is output as 10 LSB. Here, LSB is a minimum output unit of a digital value. Furthermore, the digital value, which is output, also includes read-out noise in addition to a value corresponding to the photon signal. That is, a pixel output becomes a value obtained by combining the photon signal and the read-out noise. Accordingly, a negative value may output due to the noise. In the output example in FIG. 4, a negative value is described as is, but offset may be applied to the entirety of the values, or the negative value may be rounded-up to zero.

The optical detector 23 is an assembly of the pixels 41, each being a high-sensitivity optical detection cell having a gradation output. An output signal of each of the pixels 41 of the optical detector 23 is minute so as not to perform electronic multiplication due to a strong electric field similar to APD or Si-PM. Accordingly, the output signal includes meaningful read-out noise, and thus the number of photons incident to each of the pixels 41 is unclear. However, when pixel outputs of the pixels 41 are summed, it is possible to derive the quantity of pulse light which corresponds to one ray of radiation with high accuracy.

On the other hand, in the optical detector 23, in a case where radiation is transmitted through the scintillator 21 and is directly incident to the pixel array unit 51, or in a case where a defective pixel occurs in the pixel array unit 51, the pixels 41 locally generate a large-output signal. Accordingly, it is necessary for the large-output signal, which is locally generated, to be excluded as an abnormal output signal.

Here, the optical detector 23 has a function of selectively discarding only the abnormal signal with focus given to a difference in distribution between a normal signal and the abnormal signal in the pixel array unit 51. That is, the optical detector 23 performs processing of regarding the large-output signal, which locally occurs, as a signal that cannot statistically exist from the normal signal.

A high electron multiplier tube or a typical APD detects pulse light in a single detector, and generates an analog pulse corresponding to the quantity of light. An SiPM receives pulse light with a pixel array, but only a pixel, to which a photon is incident, outputs a constant charge pulse as a binary. In addition, final output intensity is determined by the number of pulse-emitting pixels. That is, in any one of the high electron multiplier tube, the APD, the SiPM, and the like, respective pixels 41 in a two-dimensional lattice shape do not perform gradation output differently from the optical detector 23, and thus it is difficult to perform processing of determining abnormality of an output value from distribution in the pixel array unit 51 and excluding the output value as in the optical detector 23.

<1.4 Error Determination Processing>

Detailed description will be given of the error determination processing of determining an abnormal value from pixel outputs of the pixels 41 of the pixel array unit 51 and discarding the abnormal value in the optical detector 23.

Figures 5, 6:
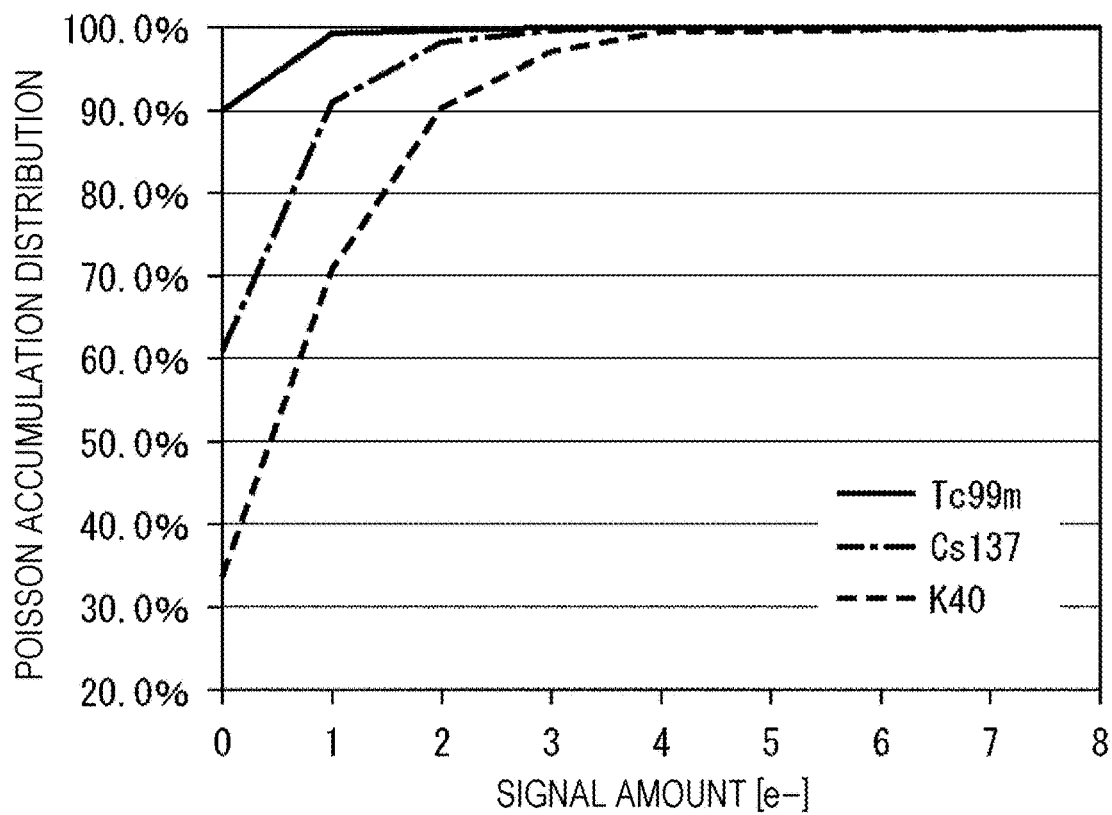
FIG. 5 is a view illustrating an estimation example of a pixel output constituted by a normal signal.
FIG. 6 is a view illustrating an estimation example of a pixel output constituted by a normal signal.

FIGS. 5 and 6 illustrate an estimation example of a pixel output constituted by a normal signal.

It is assumed that the scintillator 21 emits light with respect to radiation of three kinds of radioactive substances including technetium (Tc) 99 m, cesium (Cs) 137, and potassium (K) 40, and the optical detector 23 receives 80% of a total quantity of light-emission. In a case where the pixel array unit 51 having arrangement of 200×200 is configured as 30 μm square, an occurrence probability of signal charges (that is, the number of incident photons) (accumulation from 0 e−) of each of the pixels 41 is as illustrated in FIGS. 5 and 6. The occurrence probability can be derived from an average pixel signal $\lambda s$ expected from the upper limit of radiation energy, which is an object to be measured, in accordance with a Poisson accumulation distribution.

According to a Poisson distribution, a probability P(k) in which incidence of k photons occurs in the average pixel signal $\lambda s$ is as follows.

$$P(k)=(\lambda s)^k * e^{-\lambda s}/k!$$

The Poisson accumulation distribution illustrated in FIG. 5 is accumulation of P(0) in which k is set to 0, P(1) in which k is set to 1, P(2) in which k is set to 2, . . . .

Furthermore, the average pixel signal $\lambda s$ is a value obtained by dividing the number of effective incident photons N to the optical detector 23 by the number of total pixels, and can be approximately derived as follows.

$\lambda s = N$/the number of total pixels $N = a$ total light yield of the scintillator×radiation energy×an incidence rate of scintillation light to an optical detector×quantum efficiency of the optical detector Here, the total light yield of the scintillator is a characteristic value that is determined by the scintillator 21, and the incidence rate to the optical detector and the quantum efficiency of the optical detector are values which are determined by a structure of the partition wall 22 or the pixels 41 and are peculiar to the optical detector 23.

It is assumed that an output signal occurrence probability up to 99.999% is covered as a normal signal. At this time, for example, in a case where radiation of 1460 keV or less, which corresponds to a decay gamma ray of K40, is an object to be measured, from FIGS. 5 and 6, it can be seen that a pixel signal exceeding 8 e– is regarded as any error. When a margin corresponding to the read-out noise, for example, 3 e– is added to the pixel signal exceeding 8 e–, it is possible to set 11 e– as a threshold value of the abnormal signal. That is, when the optical detector 23 discards an output signal exceeding 11 e– from the entirety of output signals of a frame, it is possible to remove an influence of a false signal in an approximately complete manner while receiving normal signals.

In the high electron multiplier tube or the APD which is a single light-receiving element, and the SiPM in which each pixel is a binary output, it is basically difficult to separate an abnormal signal and a normal signal from each other.

In the above-described example, it is assumed that the accumulation distribution of 99.999% is set as a threshold value, but the threshold value may be flexibly set in consideration of an error rate that is permitted to a device, convenience of determination, and the like. For example, in many cases, even in a case where the threshold value is set to approximately 100 e–, it is possible to remove the majority of error factors.

In a case where the read-out noise σn of each of the pixels 41 is set to 0.5 e–rms, the total noise in the pixel array unit 51 of 200×200 is calculated as 100 e–rms. A combination of the total noise and a deviation of the number of effective incident photons N is noise regarding to the optical detector 23, and energy resolution Rp, which is calculated at full width at half maximum [%], of the optical detector 23 is estimated as follows.

$$Rp=2.35*(N+\sigma n^2*\text{number of total pixels})^{0.5}/N$$

FIG. 7 illustrates the energy resolution Rp of the optical detector 23 with regard to three kinds of radioactive substances including Tc 99 m, Cs 137, and K 40 in a case where the read-out noise σn of each of the pixels 41 is set to 0.5 e–rms.

Even in a case where the incidence amount of photons in each of the pixels 41 is unclear in comparison to the calculated energy resolution Rp of each of the radioactive substance, it can be seen that when pixel outputs are summed, detection accuracy of the quantity of pulse light is statistically secured.

Figure 8:
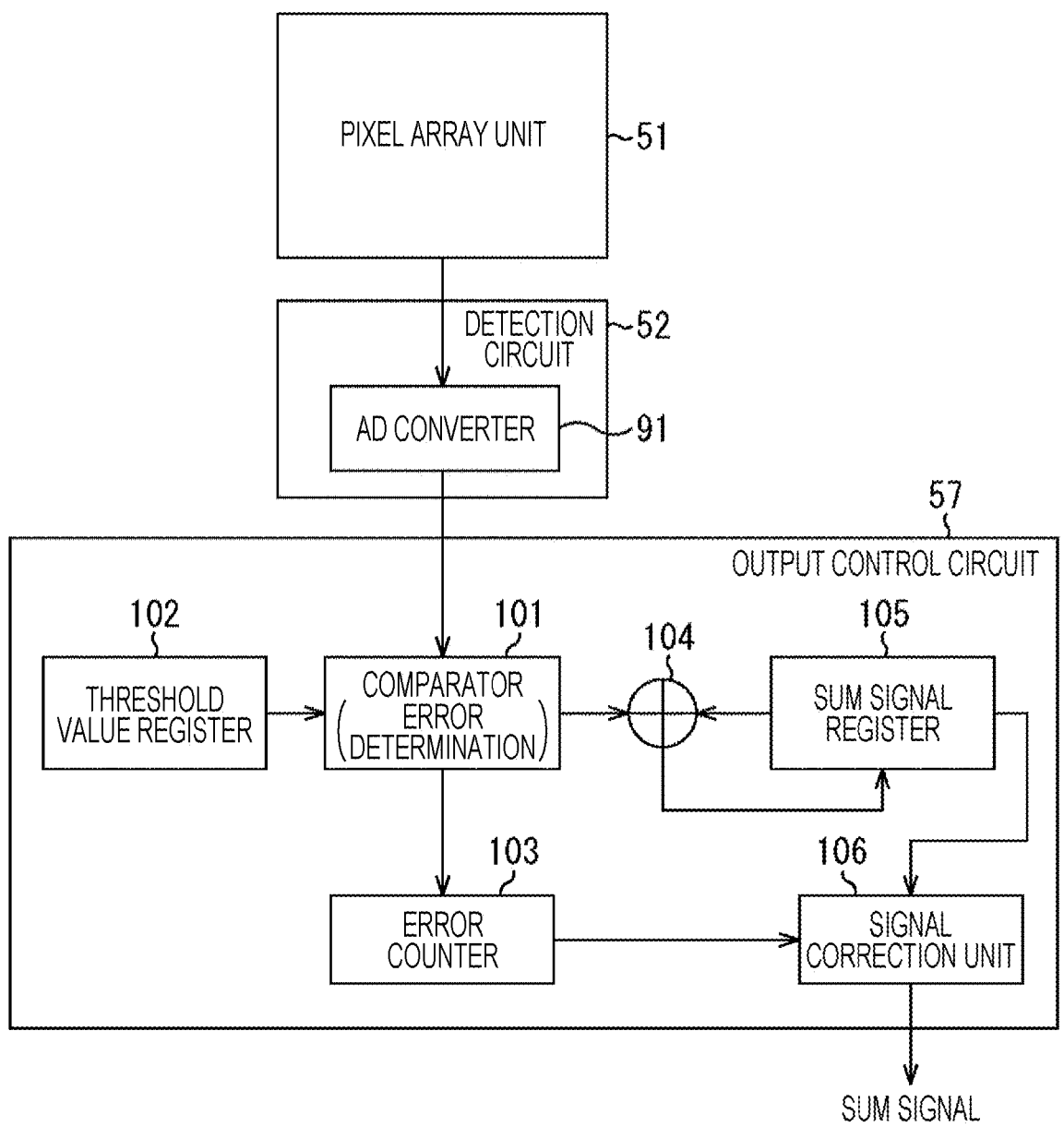
FIG. 8 is a block diagram relating to error determination processing of a radiation counter device.

FIG. 8 is a block diagram relating to the error determination processing of removing an abnormal signal as an error.

The error determination processing can be executed by the output control circuit 57 in the optical detector 23.

The output control circuit 57 includes a comparator 101, a threshold value register 102, an error counter 103, an adder 104, a sum signal register 105, and a signal correction unit 106.

In a unit detection period, an optical pulse, which is incident to a predetermined pixel 41 of the pixel array unit 51, is photo-electrically converted into an analog pixel signal, and the resultant pixel signal is supplied to the detection circuit 52 corresponding to the pixel 41. The AD converter 91 of the detection circuit 52 converts the analog pixel signal, which is supplied, into a digital value with gradation greater than 1 bit, and supplies the resultant digital value to the comparator 101 of the output control circuit 57.

The comparator 101 compares the digital value, which is supplied from the detection circuit 52 and is a pixel output value of the predetermined pixel 41, with a threshold value that is read out from the threshold value register 102 to determine whether or not the pixel output value is an error. From the result of the comparison between the pixel output value and the threshold value, in a case where it is determined that the pixel output value is greater than the threshold value and is an error, the comparator 101 discards the pixel output value, and increments a count value of the error counter 103. On the other hand, in a case where it is determined that the pixel output value is not an error, the comparator 101 supplies the pixel output value to the adder 104.

The threshold value register 102 stores a plurality of threshold values which are different for every use case, and supplies the plurality of threshold values to the comparator 101 as necessary. The error counter 103 increments or resets an internal counter in correspondence with a command that is supplied from the comparator 101.

The adder 104 adds the pixel output value that is supplied from the comparator 101, and a sum that is supplied from the sum signal register 105, and supplies the addition result to the sum signal register 105. The sum signal register 105 supplies the sum, which is stored therein, to the adder 104, and overwrites a sum, which is newly supplied from the adder 104, on the sum that is stored by that time, and stores the resultant sum. In addition, in a case where summation corresponding to one frame is terminated, the sum signal register 105 supplies the sum, which is stored therein, to the signal correction unit 106.

The error counter 103 stores the number of times (count value) of determination of the pixel output value as an error, and supplies the count value to the signal correction unit 106.

The signal correction unit 106 executes correction processing of correcting the sum, which is supplied from the sum signal register 105, into a sum corresponding to one frame on the basis of the error count value that is supplied from the error counter 103. Specifically, in a case where the total number of pixels 41 of the pixel array unit 51 is M, and the number of errors is E, the sum, which is stored in the sum signal register 105, is a total value of outputs of (M–E) pixels. The signal correction unit 106 performs correction into a sum corresponding to M pixels by multiplying the sum stored in the sum signal register 105 by M/(M–E). However, in a case where E is sufficiently smaller than M, the correction may be omitted.

Description will be given of the error determination processing that is executed by the output control circuit 57 with reference to a flowchart in FIG. 9.

Figure 9:
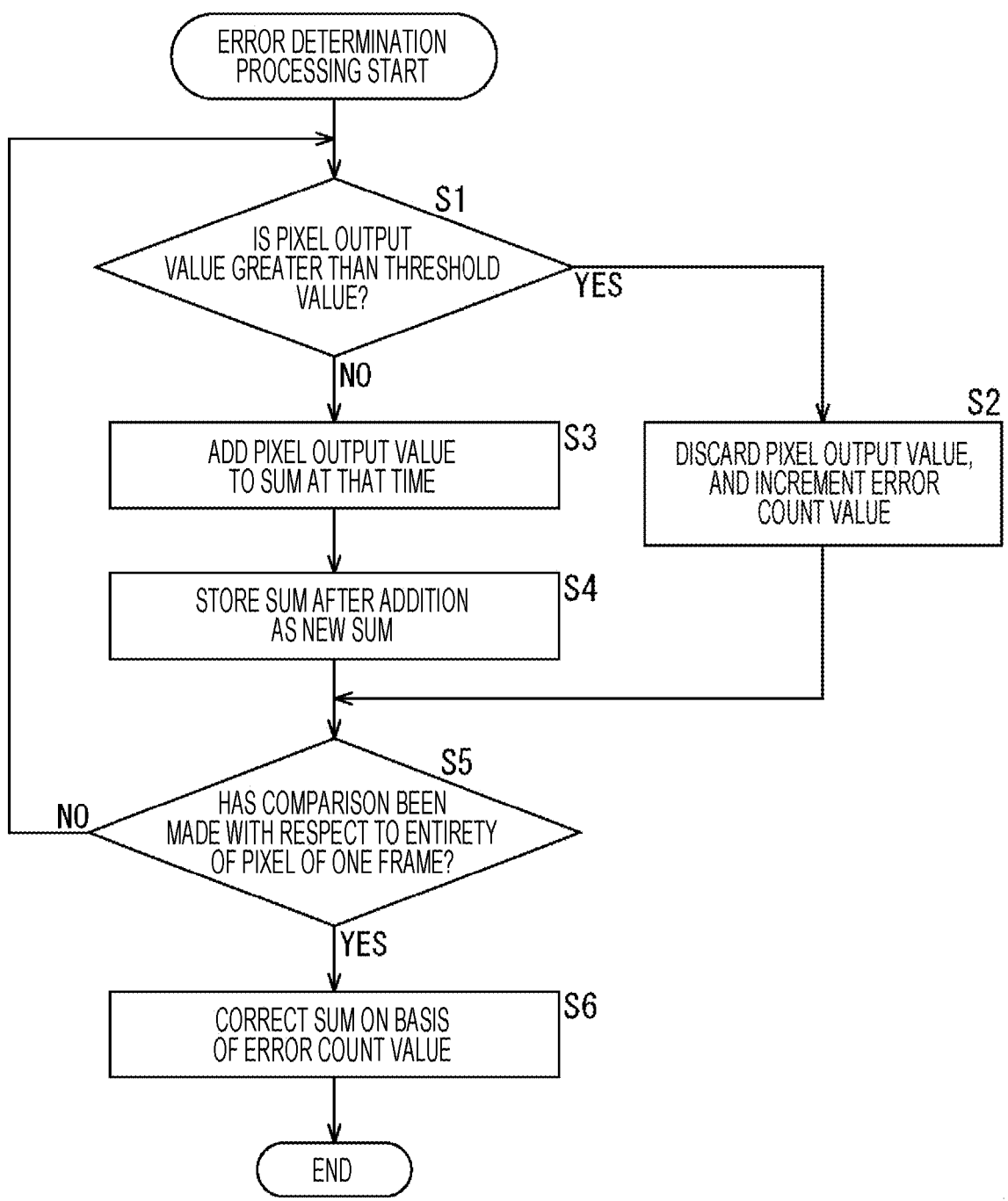
FIG. 9 is a flowchart illustrating the error determination processing.

The error determination processing in FIG. 9 is initiated, for example, when a first pixel output of the pixels 41 corresponding to one frame is supplied on the assumption that pixel output values of the pixels 41, which correspond to one frame, of the pixel array unit 51 are sequentially supplied to the output control circuit 57, for example, in a predetermined order such as a raster scan order.

First, in step S1, the comparator 101 determines whether or not the pixel output value is an error through determination as to whether or not an pixel output value of a predetermined pixel 41, which is supplied, is greater than a threshold value that is read out from the threshold value register 102.

In step S1, in a case where it is determined that the pixel output value that is supplied is greater than the threshold value and is an error, the processing proceeds to step S2, and the comparator 101 discards the pixel output value, and increments the count value (error count value) of the error counter 103.

On the other hand, in step S1, in a case where it is determined that the pixel output value that is supplied is equal to or less than the threshold value, and is not an error, the processing proceeds to step S3, and the comparator 101 supplies the pixel output value to the adder 104. In addition, the adder 104 adds the pixel output value that is supplied from the comparator 101 and the sum that is acquired from the sum signal register 105, and supplies the sum after addition to the sum signal register 105.

Next, in step S4, the sum signal register 105 performs overwriting of the sum, which is supplied from the adder 104, as a new sum, and stores the sum.

In step S5, the output control circuit 57 determines whether or not comparison between pixel output values of the entirety of pixels 41 corresponding to one frame and the threshold value has been made.

In step S5, in a case where it is determined that the comparison is not completed with respect to the entirety of pixels corresponding to one frame, the processing returns to step S1. In addition, processing in steps S1 to S5 is repeated with respect to the subsequent pixel output value that is supplied from the detection circuit 52.

On the other hand, in step S5, in a case where it is determined that the comparison is completed with respect to the entirety of pixels corresponding to one frame, the processing proceeds to step S6, and the signal correction unit 106 corrects the sum, which is supplied from the sum signal register 105, into a sum corresponding to one frame on the basis of the error count value that is supplied from the error counter 103. In addition, the signal correction unit 106 supplies a sum signal indicating the sum after correction to the data processing unit 12 on a rear stage as an output signal of the optical detector 23, and terminates the error determination processing.

As described above, in the error determination processing, the output control circuit 57 compares the pixel output value with the threshold value that is read-out from the threshold value register 102, and outputs a sum signal obtained by adding only pixel output values, which are determined as a normal signal, after discarding a pixel output value that is an error. According to this, it is possible to more accurately detect weak pulse light, and it is possible to more accurately perform radiation counting.

In the above-described error determination processing, the output control circuit 57 performs output after correction of a signal corresponding to a pixel that is discarded as an error. However, the correction processing may be omitted in accordance with the number of error pixels.

The above-described error determination processing is an example in which determination of an abnormal signal is performed in a one-pixel unit, but determination of the abnormal signal may be performed in a two-pixel unit or in a group unit of a small number of plurality of pixels. In this case, the optical detector 23 derives a total value of pixel output values for every pixel group, and discards a total value with respect to a pixel group in which a pixel output value is greater than the threshold value and does not add the pixel value to the sum. In a case where the error determination processing is performed in a pixel group, a pixel output value of a normal signal may be included in the sum that is discarded. Therefore, if the size of the group unit increases, deficiency of pixel information occurs in proportional to the increase. Accordingly, in a case of performing determination of the abnormal signal in a pixel group unit, it is preferable that the number of pixels, which constitute one pixel group, is 1/100 or less times the entirety of pixels.

In addition, in the above-described error determination processing, the output control circuit 57 adds data of the entirety of pixels corresponding to one frame and outputs the sum to the data processing unit 12 on a rear stage, but an addition and output unit may be set to a row, a plurality of rows, or a block that is constituted by a plurality of pixels. In this case, pixel output values, which correspond to the number of pixels of the pixel array unit 51, are added to each other except for a pixel output value corresponding to an error by the data processing unit 12 and the like on a rear stage, and the quantity of pulse light can be derived by using the resultant sum.

In addition, the above-described example is an example in which the output control circuit 57 in the optical detector 23 executes the error determination processing, but the data processing unit 12 on a rear state of the optical detector 23 may execute the error determination processing.

The above-described error determination processing is also effective for removing an influence of a white spot that is an initial defect of pixels which are formed on a semiconductor substrate, a flickering white spot, or burst noise that irregularly occurs. In addition, the error determination processing is applicable to general measurement of a minute optical pulse without limitation to counting of radiation. A threshold value at that time can be derived from an average pixel signal $\lambda s$, which is expected from the upper limit of pulse intensity that is an object to be measured, in accordance with the Poisson accumulation distribution.

However, in a case where read-out noise of a pixel is sufficiently small, when not only the above-described threshold value of the upper limit but also a threshold value relating to the lower limit is set, and similar error determination is performed for every pixel, it is possible to further improve detection accuracy of the quantity of pulse light.

In an output distribution illustrated in FIG. 4, a pixel to which one photon is incident has a fluctuation, which corresponds to the read-out noise, around 10 LSB that corresponds to one photon signal. For example, read-out noise of 0.4 e–rms corresponds to 4 LSB, but at this time, a fluctuation greater than 8 LSB that is $2\sigma$ occurs, and an output probability of a signal smaller than 2 LSB is 98% or less. That is, even though a signal smaller than 2 LSB is regarded as no signal and is removed from a count through the error determination processing, 98% of photon signals is acquired, and thus a decrease in sensitivity is small.

On the other hand, a no-signal pixel to which a photon is not incident has a similar fluctuation around 0 LSB, but when a pixel that is 2 LSB or less is treated as a no-signal pixel, 98% of the fluctuation component is filtered.

As described above in the present technology, in a case of deriving the quantity of incident light by using a total of outputs of a pixel array including a plurality of pixels, the filtering of the fluctuation component of the no-signal pixel directly leads to an improvement of accuracy in quantity-of-light determination.

Figure 10:
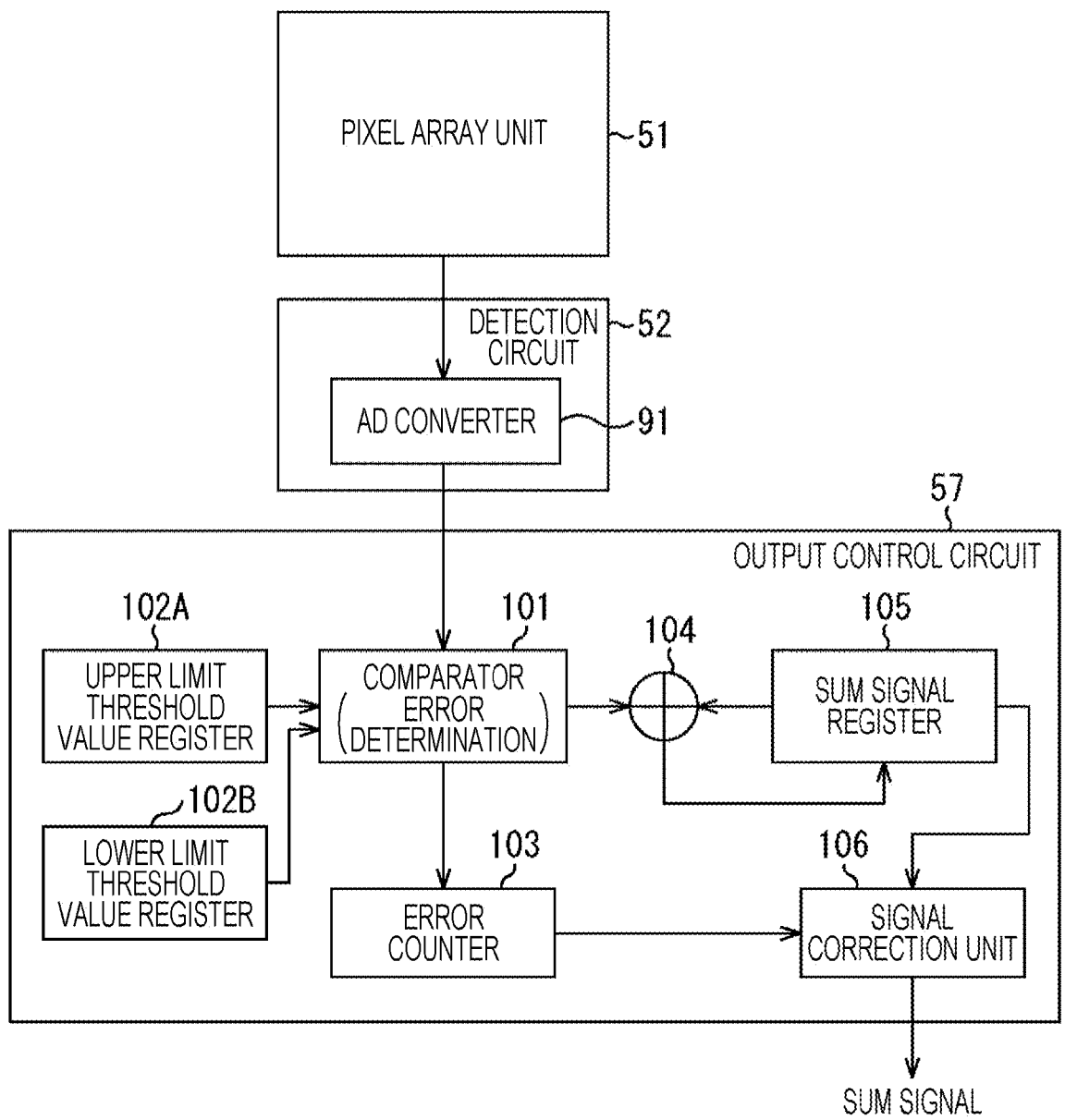
FIG. 10 is a block diagram relating to error determination processing of the radiation counter device.

FIG. 10 is a block diagram relating to the error determination processing in a case where a threshold value is also set with regard to not only the upper limit but also the lower limit.

A difference between FIG. 10 and FIG. 8 is in that in the output control circuit 57, the threshold value register 102 in FIG. 8 is substituted with an upper limit threshold value register 102A and a lower limit threshold value register 102B in FIG. 10.

The upper limit threshold value register 102A stores a threshold value of the upper limit (upper limit threshold value) which is a similar to the threshold value in the threshold value register 102 in FIG. 8, and supplies the upper limit threshold value to the comparator 101 as necessary. In contrast, the lower limit threshold value register 102B stores a threshold value of the lower limit (lower limit threshold value) which is a different from the threshold value in the threshold value register 102 in FIG. 8, and supplies the lower limit threshold value to the comparator 101 as necessary. Similar to the threshold value register 102, the upper limit threshold value register 102A and the lower limit threshold value register 102B store a plurality of the upper limit threshold values or a plurality of the lower limit threshold values which are different for every use case.

Figure 11:
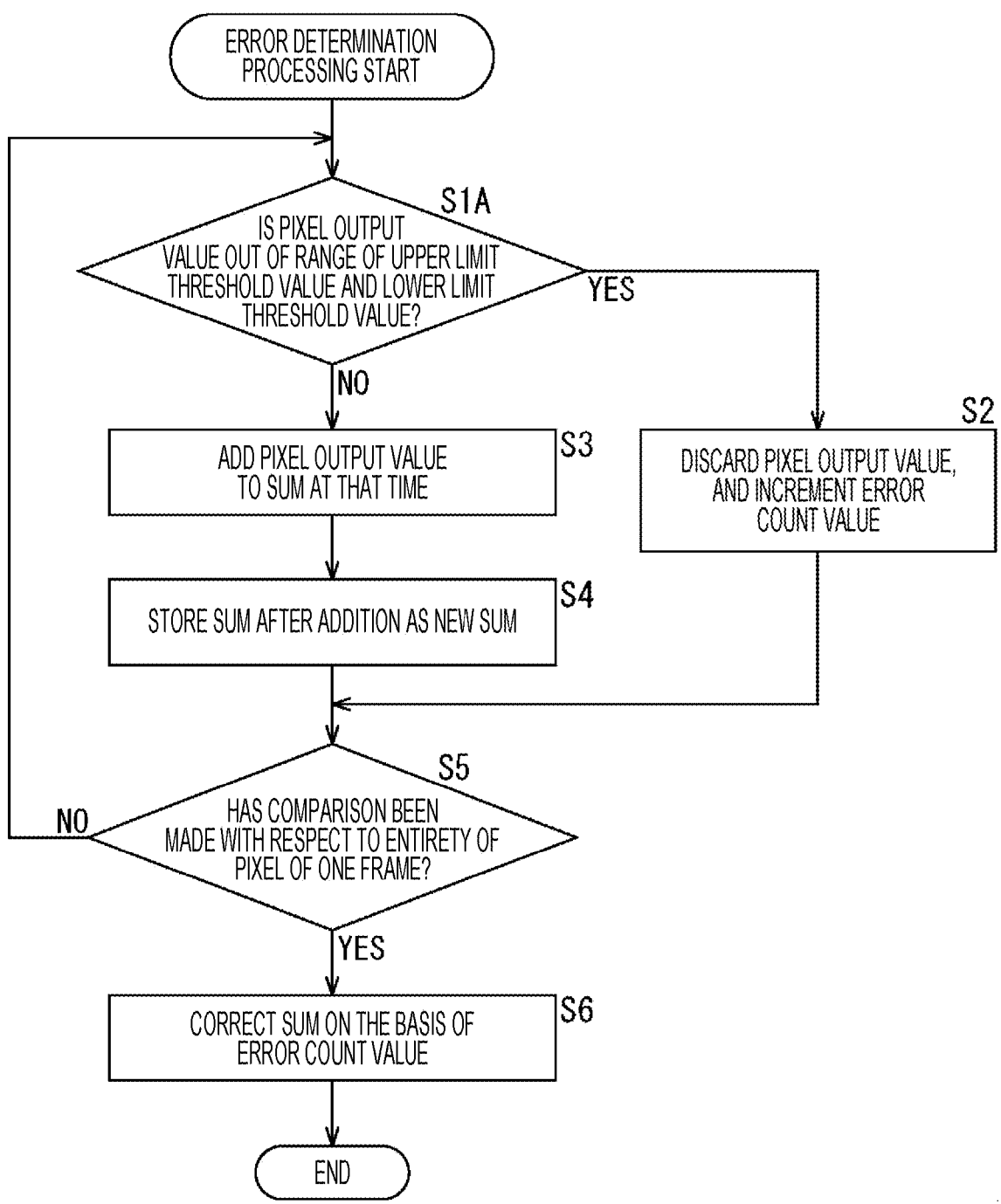
FIG. 11 is a flowchart illustrating the error determination processing.

FIG. 11 is a flowchart of the error determination processing that is executed by the output control circuit 57 illustrated in FIG. 10.

In the error determination processing in FIG. 11, step S1 in the error determination processing in FIG. 9 is substituted with step S1A.

In step S1A, the comparator 101 determines whether or not the pixel output value is an error through determination as to whether or not a pixel output value of a predetermined pixel 41, which is supplied, is out of the range of the upper limit threshold value read out from the upper limit threshold value register 102A, and the lower limit threshold value read out from the lower limit threshold value register 102B.

In step S1A, in a case where it is determined that the pixel output value that is supplied is out of the range of the upper limit threshold value and the lower limit threshold value and is an error, the processing proceeds to step S2. On the other hand, in a case where it is determined that the pixel output value is within the range of the upper limit threshold value and the lower limit threshold value, the processing proceeds to step S3.

The processing in steps S2 to S6 is similar to the error determination processing described with reference to FIG. 9, and thus detailed description thereof will be omitted. The pixel output value, which is out of the range of the upper limit threshold value and the lower limit threshold value, is referred to as "error", and the error count value is incremented. In addition, pixel output values, which are within the range of the upper limit threshold value and the lower limit threshold value are summed, and the sum is corrected as a sum corresponding to one frame. The resultant sum is supplied to the data processing unit 12 on a rear stage as an output signal of the optical detector 23.

As described above, with respect to the pixel output value, not only the upper limit threshold value but also the lower limit threshold value is set, and an arbitrary pixel output value is excluded as error data. As a result, it is possible to further improve the detection accuracy of the quantity of pulse light.

Operation Sequence of Pixel 41

Figure 12:
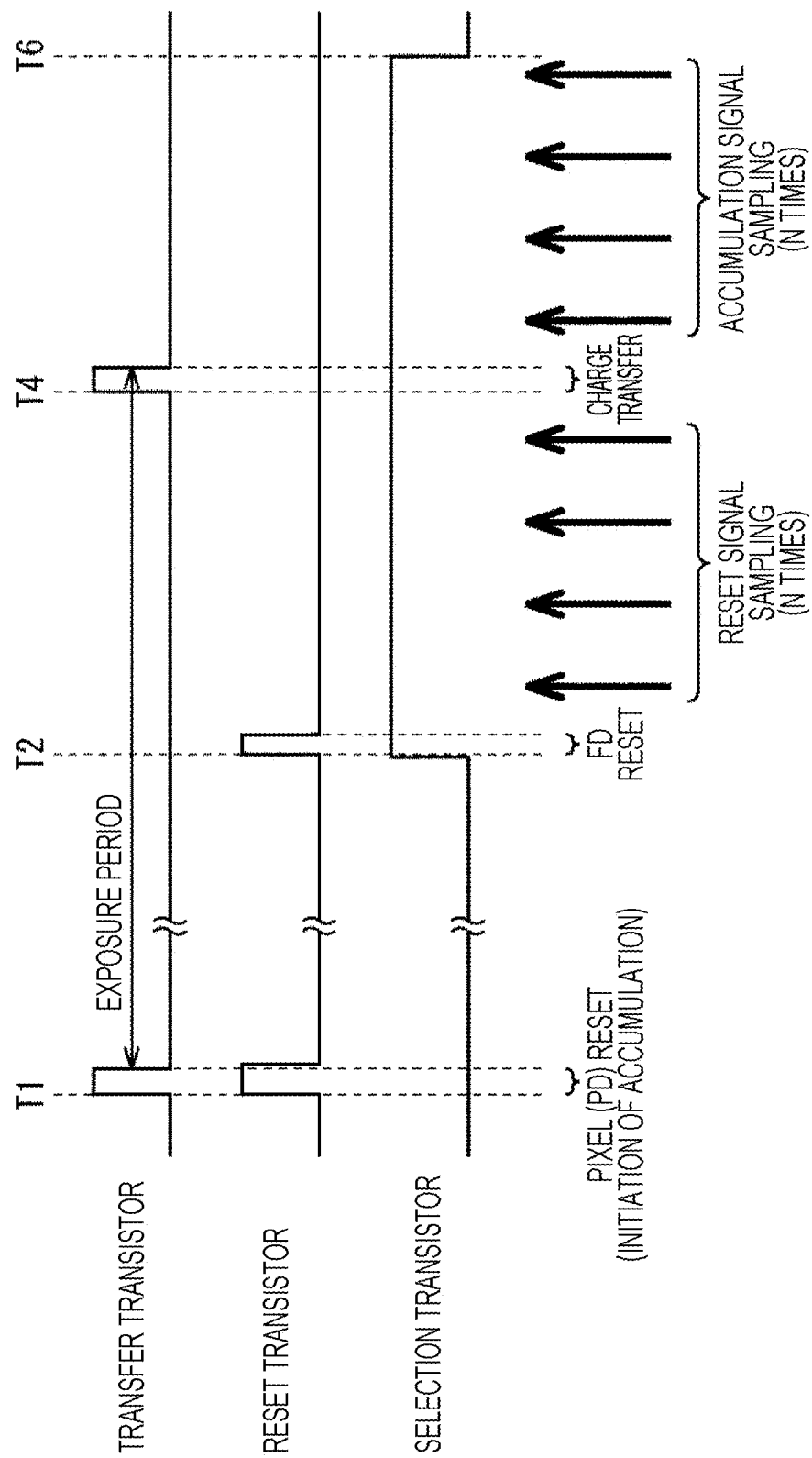
FIG. 12 is a timing chart illustrating an operation sequence of pixels.

An operation of the pixel 41 will be described with reference to FIG. 12. FIG. 12 is a timing chart illustrating an operation sequence of the pixel 41.

At timing T1 immediately before an exposure period, the row drive circuit 54 controls the transfer transistor 73 and the reset transistor 75 to be an ON-state. Due to the control, the entirety of charges, which are accumulated in the accumulation node 72 between the photodiode 71 and the transfer transistor 73, are discharged to the power supply VDD. This control is referred to as "PD reset".

Subsequently, the row drive circuit 54 controls the transfer transistor 73 to be an OFF-state. Due to this control, the accumulation node 72 enters a floating state, and new charge accumulation is initiated. In addition, the row drive circuit 54 controls the reset transistor 75 to be an OFF-state after the PD reset. Furthermore, during charge accumulation, the reset transistor 75 may be in the ON-state as is.

On the other hand, the selection transistor 77 is controlled to be an OFF-state so as to realize access to other pixels 41 which are connected to the vertical signal line 58.

In addition, at timing T2 before termination of the exposure period, the row drive circuit 54 controls the reset transistor 75 and the selection transistor 77 to be an ON-state. Since the selection transistor 77 enters the ON-state, a selected pixel 41 is connected to the vertical signal line 58. In addition, since the reset transistor 75 enters the ON-state, the detection node 76 that is an input of the amplification transistor 74 and the power supply VDD are short-circuited. According to this, a reference potential is generated in the selected pixel 41.

When a predetermined high-pulse period has elapsed from the timing T2, the row drive circuit 54 controls the reset transistor 75 to be an OFF-state. Due to this control, a potential of the detection node 76 decreases from the reference potential by a certain extent due to coupling with the gate of the reset transistor 75, and the detection node 76 enters a floating state. In addition, meaningful kTC noise occurs in the detection node 76 at this time. Typically, as the detection node 76, a floating diffusion layer can be used. Accordingly, a control of resetting the potential of the detection node 76 by setting the reset transistor 75 to an ON-state is referred to as "FD reset".

The detection circuit 52 performs N times (for example, four times) of sampling between the FD reset and termination of the exposure period. Due to the sampling, a signal of a potential of the vertical signal line 58 is converted into a digital signal Ds1 as a reset signal by the AD converter 91 of the detection circuit 52. Multiple sampling of the reset signal is treated as first read-out in correlated double sampling.

In addition, at timing T4 immediately before termination of the exposure period, the row drive circuit 54 controls the transfer transistor 73 to be an ON-state. Due this control, charges, which are accumulated in the accumulation node 72 are transferred to the detection node 76. At this time, when the potential of the detection node 76 is sufficiently deep, the entirety of electrons, which are accumulated in the accumulation node 72, are transferred to the detection node 76, and the accumulation node 72 enters a completely depleted state. When a predetermined high pulse period has elapsed from the timing T4, the row drive circuit 54 controls the transfer transistor 73 to be an OFF-state. Due to this control, the potential of the detection node 76 further drops in comparison to a potential before operation of the transfer transistor 73 by the amount of charges accumulated (that is, the potential becomes shallow). A voltage corresponding to the drop is amplified by the amplification transistor 74, and is output to the vertical signal line 58.

The detection circuit 52 performs N times (for example, four times) of sampling between time at which the transfer transistor 73 is controlled to be the OFF-state and subsequent timing T6. In the sampling, a signal of the potential of the vertical signal line 58 is converted into a digital signal Ds2 as an accumulation signal by the AD converter 91 of the detection circuit 52. Multiple sampling of the accumulation signal is treated as the second read-out in correlated double sample.

The detection circuit 52 compares the digital signal Ds2 that is the accumulation signal that is sampled, and the digital signal Ds1 that is a reset signal, and calculates a pixel output value corresponding to the amount of incident photon on the basis of the comparison result.

More specifically, the detection circuit 52 adds the entirety of a plurality of sampled digital signals Ds1, and calculates an average value thereof. Similarly, the entirety of a plurality of sampled digital signals Ds2 are also added, and an average value thereof is calculated. The detection circuit 52 acquires a difference between the average value of the digital signals Ds1 and the average value of the digital signals Ds2 as a net accumulation signal. The net accumulation signal becomes a pixel output value corresponding to the amount of incident photons. The kTC noise, which occurs during the FD reset, is canceled when the difference between the digital signals Ds1 and Ds2 is set as the net accumulation signal.

As described above, the noise can be reduced by sampling the digital signals Ds1 and Ds2 N times (plurality of times), but the number of times of sampling may be once. In addition, in a case of sampling the digital signals a plurality of times, the signals may be processed as N-times signals in a total value state without calculating an average.

The exposure period of each of the pixels 41 is a period between the reset operation and the read-out operation, and accurately a period until the transfer transistor 73 is turned-off at the timing T4 after the transfer transistor 73 is turned-off after being turned-on at the timing T1. When a photon is incident to the photodiode 71 at the exposure period and a charge is generated, the generated charge becomes a net accumulation signal that is represented by a difference between a reset signal and an accumulation signal, and is derived by the detection circuit 52 in accordance with the above-described sequence.

Furthermore, after the exposure is terminated, time until exposure is initiated after the subsequent timing T1 is reached becomes an insensible period. In a case where occurrence of the insensible period is not appropriate from the viewpoint of sensitivity of a device, a read-out row may be immediately subjected to the PD reset. Alternatively, the PD reset may be omitted, and charge transfer at timing T4 may also function as the PD reset at the timing T1. When the PD reset is omitted, the subsequent charge accumulation in the photodiode 71 is initiated immediately after charge transfer at which exposure is terminated. According to this, the insensible period becomes zero. In this case, an exposure time is determined by a frame rate.

However, for example, in a case where respective pixels 41, which are connected to the detection circuits 52A to 52D in the pixel array unit 51, are regarded as a pixel group, and data processing is performed in a pixel group unit, it is possible to greatly simplify the read-out process. That is, 50 pixels 41 are connected to the detection circuit 52A in the pixel array unit 51, and this is true of the detection circuits 52B to 52D. It is possible to easily perform processing of performing pixel output value addition for every pixel group with respect to the reset signal and the accumulation signal in a state in which the 50 pixels 41 are set as a pixel group, and of setting the difference as a total output of the net accumulation signal of the pixel groups in the detection circuits 52A to 52D. Accordingly, it is not necessary to transfer a group of data, which is AD-converted in a four-row unit, to the output control circuit 57, and each pixel group may transfer the total output of the net accumulation signals once in one frame.

In a case where the read-out process is performed in a pixel group unit, the output control circuit 57 executes the error determination processing in the pixel group unit. In a case where determination of an abnormal signal is performed in the pixel group unit, the number of pixels, which constitute one pixel group, is preferably set to $1/100$ or less times the entirety of pixels as described above. In this embodiment, the number of shared pixels of the detection circuits 52A to 52D is 50, and thus the number of pixels, which constitute the one pixel group, is $1/800$ times the entirety of pixels of the pixel array unit 51 including 200×200 pixels, and thus $1/100$ or less times is satisfied.

<Read-Out Sequence of Entirety of Pixel Array Unit 51>

Next, description will be given of a read-out operation of the entirety of the pixel array unit 51 in a case of performing pixel output simultaneously in a four-row unit with reference to FIG. 13.

Figure 13:
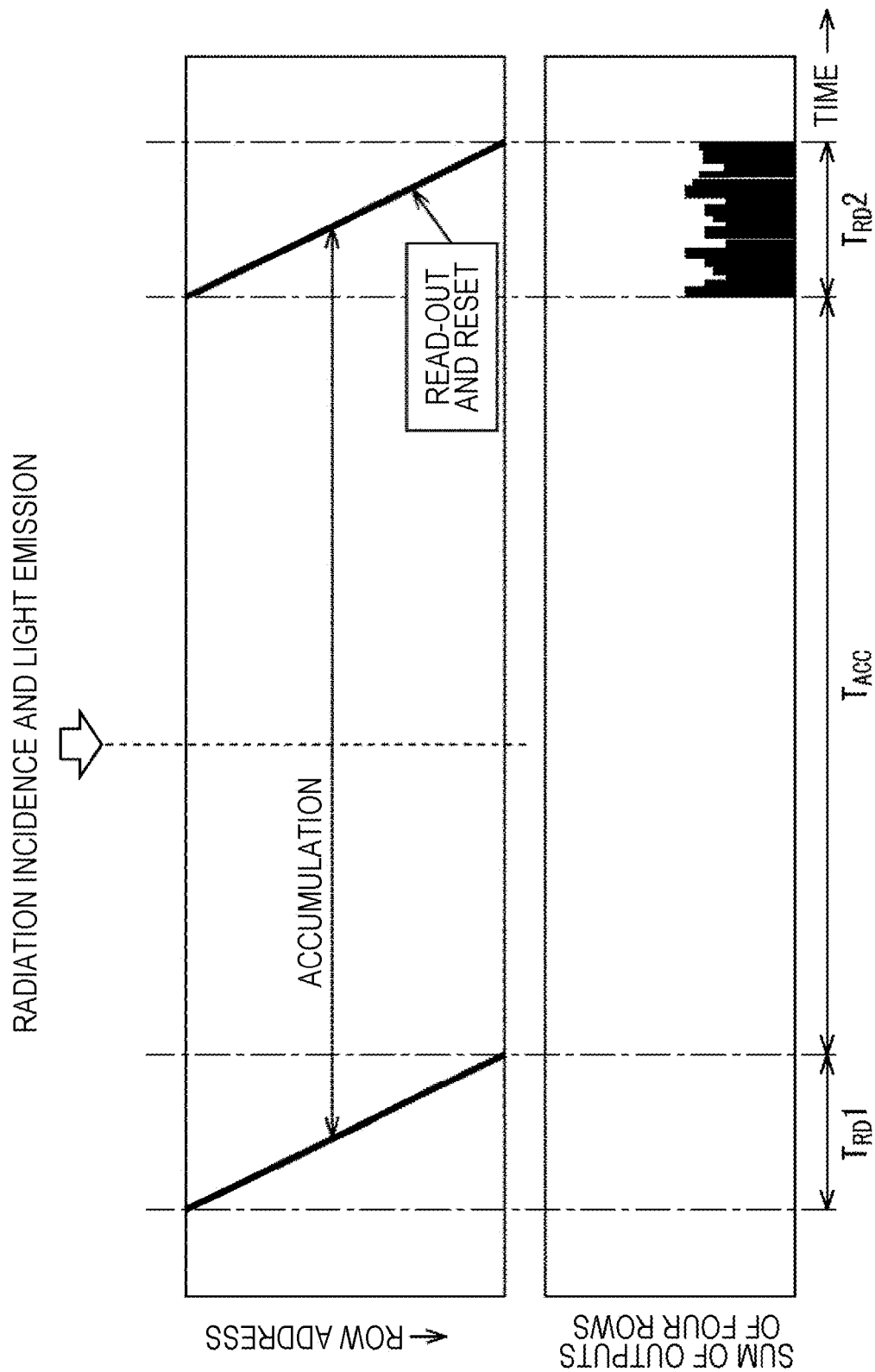
FIG. 13 is a timing chart illustrating a read-out operation of the entirety of a pixel array unit.

FIG. 13 is a timing chart illustrating a read-out sequence of pixel data of one frame. In FIG. 13, the vertical axis represents a row address, and the horizontal axis represents time.

In the optical detector 23, read-out of pixel data in a four-row unit is performed with respect to the entirety of pixels at the same time interval. Pixel rows of the pixel array unit 51 are simultaneously selected in a four-row unit, and access is performed sequentially from a lower address. A pixel output is described as a total value of four rows at a lower stage.

In the simplest method, each of the pixels 41 is subjected to the PD reset immediately after being read-out, and minute pulse-light detection is initiated. In addition, read-out is sequentially performed after passage of the constant unit detection period $T_{ACC}$. A light-emission pulse, which is incident in the unit detection period $T_{ACC}$ from a termination time of read-out $T_{RD}1$ to an initiation time of the subsequent read-out $T_{RD}2$, is output as frame data in read-out of read-out $T_{RD}2$.

In a case where incidence frequency of radiation, that is, occurrence frequency of light-emission pulse is low, and the unit detection period $T_{ACC}$ can be set to be sufficiently longer with respect to a read-out period, or in a case where light-emission pulse occurrence timing can be controlled by an external device and the like, there is no problem in the read-out operation as illustrated in FIG. 13.

However, the occurrence frequency of the light-emission pulse is relatively high and timing is not known, the following two problems exist. One problem is a problem that a plurality of times of pulse light-emission may exist in the unit detection period $T_{ACC}$, and the other problem is a problem that pulse light-emission may exist in the read-out period. Hereinafter, specific example of occurrence of the two problems, and a countermeasure method thereof will be described.

<Countermeasure Method in Case Where Plurality of Times of Pulse Light-Emission Exist in Unit Detection Period $T_{ACC}$>

First, description will be given of a countermeasure method in a case where a plurality of times of pulse light-emission exist in the unit detection period $T_{ACC}$.

Figure 14:
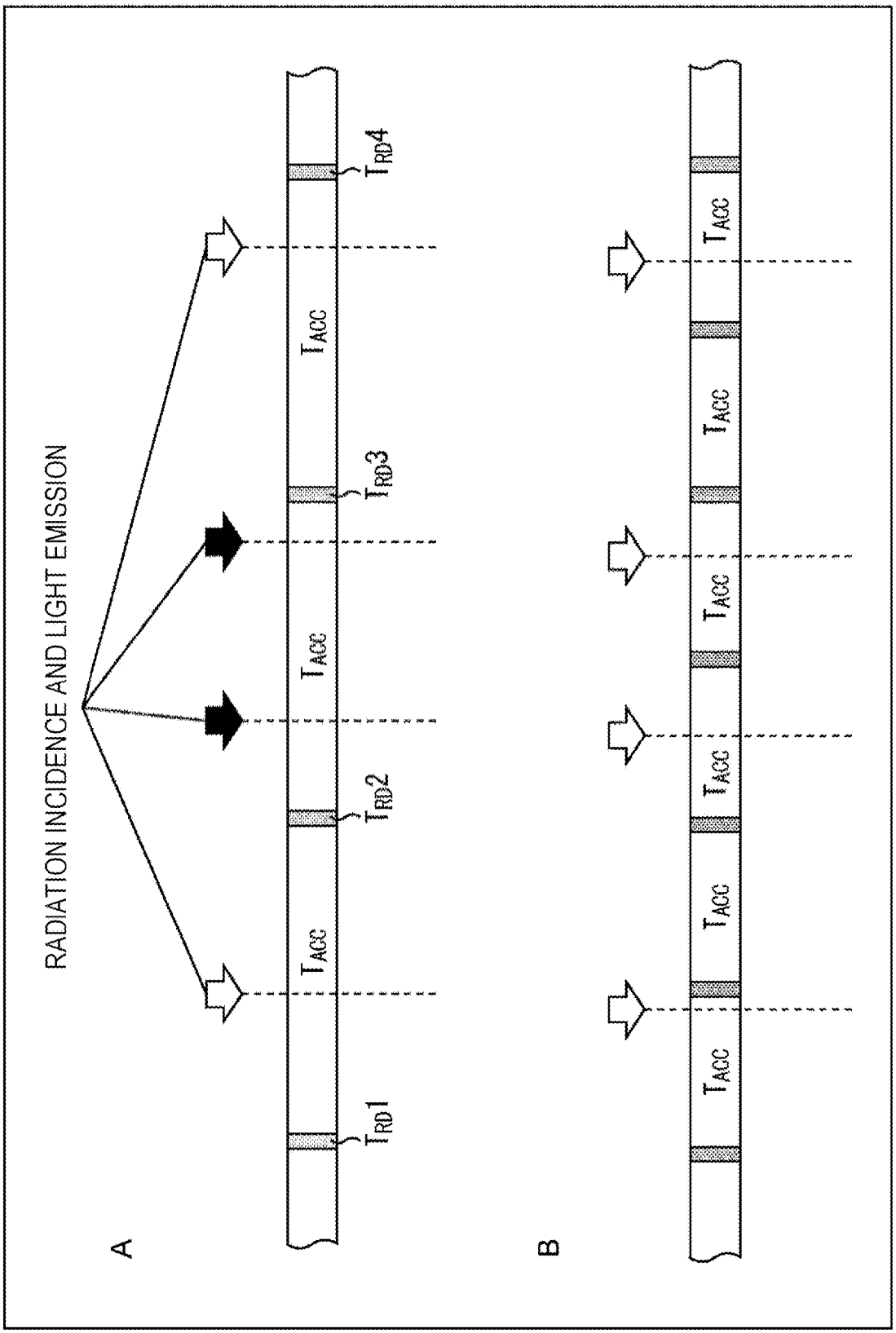
FIG. 14 is a view illustrating a countermeasure method in a case where a plurality of times of pulse light-emission occur in a unit detection period.

A of FIG. 14 is a view illustrating an example in which a plurality of times of pulse light-emission exist in the unit detection period $T_{ACC}$.

A of FIG. 14 illustrates a state in which two rays of radiation are incident to the scintillator 21, and thus pulse light-emission occurs in the unit detection period $T_{ACC}$ from a termination time of read-out $T_{RD}2$ and an initiation time of the subsequent read-out $T_{RD}3$. In this case, it is difficult to obtain correct radiation energy from pixel data that is read-out in the read-out $T_{RD}3$.

With regard to the problem, as illustrated in B of FIG. 14, the optical detector 23 countermeasures the problem by shortening an accumulation time of the pixel 41, that is, the unit detection period $T_{ACC}$. That is, first, an error occurrence rate, which is permissible in the optical detector 23, is determined in advance. In addition, in a case where an error occurrence rate higher than the error occurrence rate that is determined in advance is expected from measurement data, the optical detector 23 shortens the unit detection period $T_{ACC}$, and raises read-out frequency.

As in radiation counting and the like, in a case where a light-emission pulse randomly occurs, the error occurrence rate also conforms to the Poisson distribution, and thus it is possible to predict the error occurrence rate from the light-emission pulse counting rate.

Figure 15:
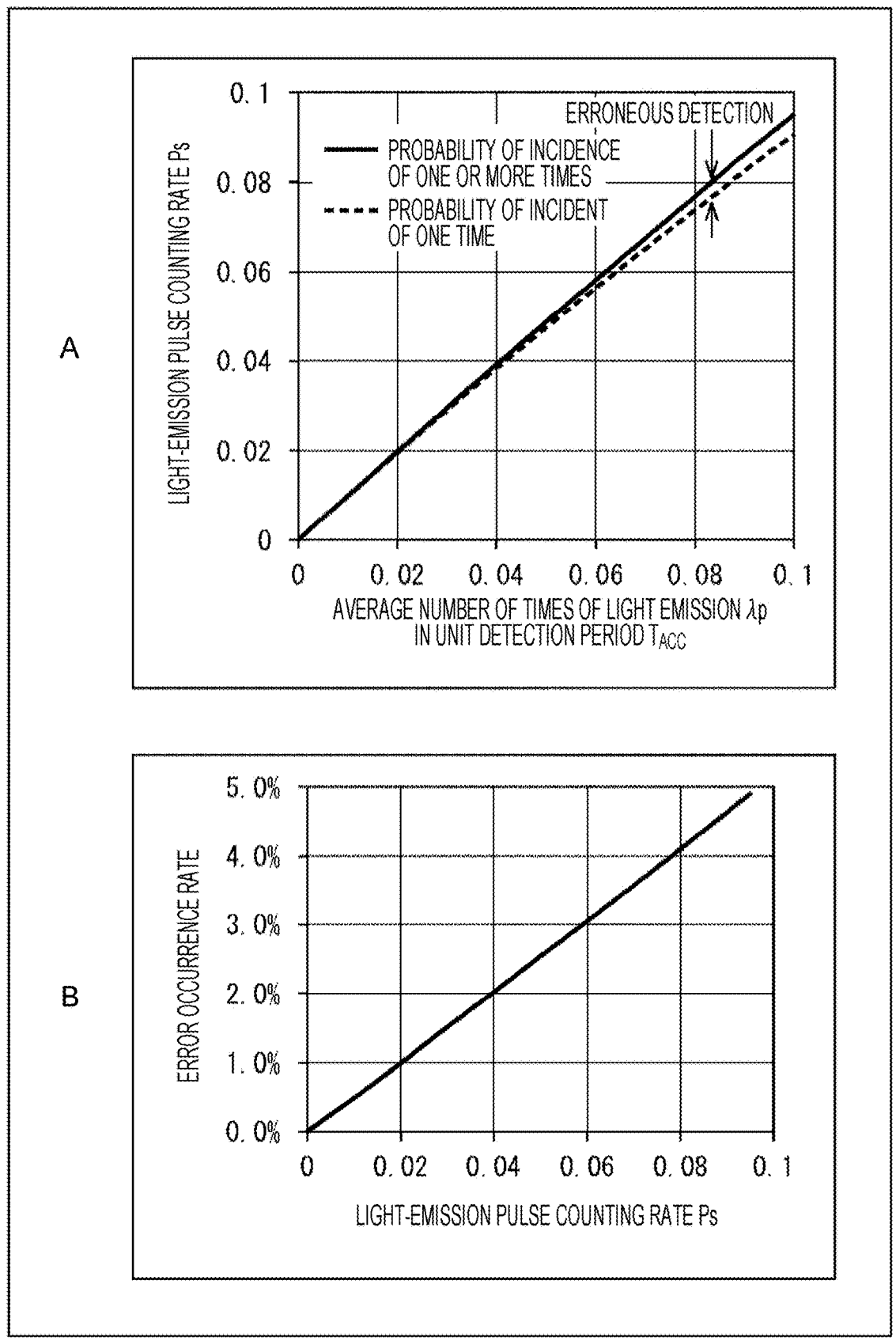
FIG. 15 is a graph illustrating a relationship between a counting rate and an error occurrence rate of an optical pulse.

A of FIG. 15 is a graph illustrating a light-emission pulse counting rate Ps with respect to an average number of times of light-emission λp of the light-emission pulse in the unit detection period $T_{ACC}$.

The light-emission pulse counting rate Ps is a light-emission pulse detection ratio and is a probability of occurrence of one or more times of light-emission in the unit detection period $T_{ACC}$.

Here, a probability of occurrence of k times of light-emission can be expressed by the following expression.

$$P(k)=(\lambda p)^k * e^{-\lambda p}/k!$$

The light-emission pulse counting rate Ps becomes an accumulation from k=1 to k=∞ in the probability P(k). Only in a case of k=1, energy is correctly detected, and this case corresponds to a broken line in the graph in A of FIG. 15.

A difference between a solid line and a broken line in A of FIG. 15 represents erroneous detection. For example, when the light-emission pulse counting rate Ps is 0.08, as an actual average number of times of light-emission λp, 0.0834 is expected, and a correct energy detection ratio becomes 0.0767 in the broken line. The difference 0.0033 at this time is an erroneous detection occurrence probability, and corresponds to 4.1% of the light-emission pulse counting rate Ps.

That is, in a case where the light-emission pulse counting rate Ps is 8%, the error occurrence rate is 4.1%, it can be determined that two or more times of light-emission occurs at 4.1% of pixel data that is counted, and thus an error occurs in energy detection.

B of FIG. 15 is a graph illustrating a relationship between the light-emission pulse counting rate Ps and an error occurrence rate at that time.

From the relationship between the light-emission pulse counting rate Ps and the error occurrence rate as illustrated in B of FIG. 15, for example, in a case of desiring to maintain the error occurrence rate to 1% or less, the detection cycle may be shortened by shortening the accumulation time of the pixel 41, that is, the unit detection period $T_{ACC}$ so that the light-emission pulse counting rate Ps becomes 2% or less.

<Flowchart of Detection Cycle Control Processing>

Figure 16:
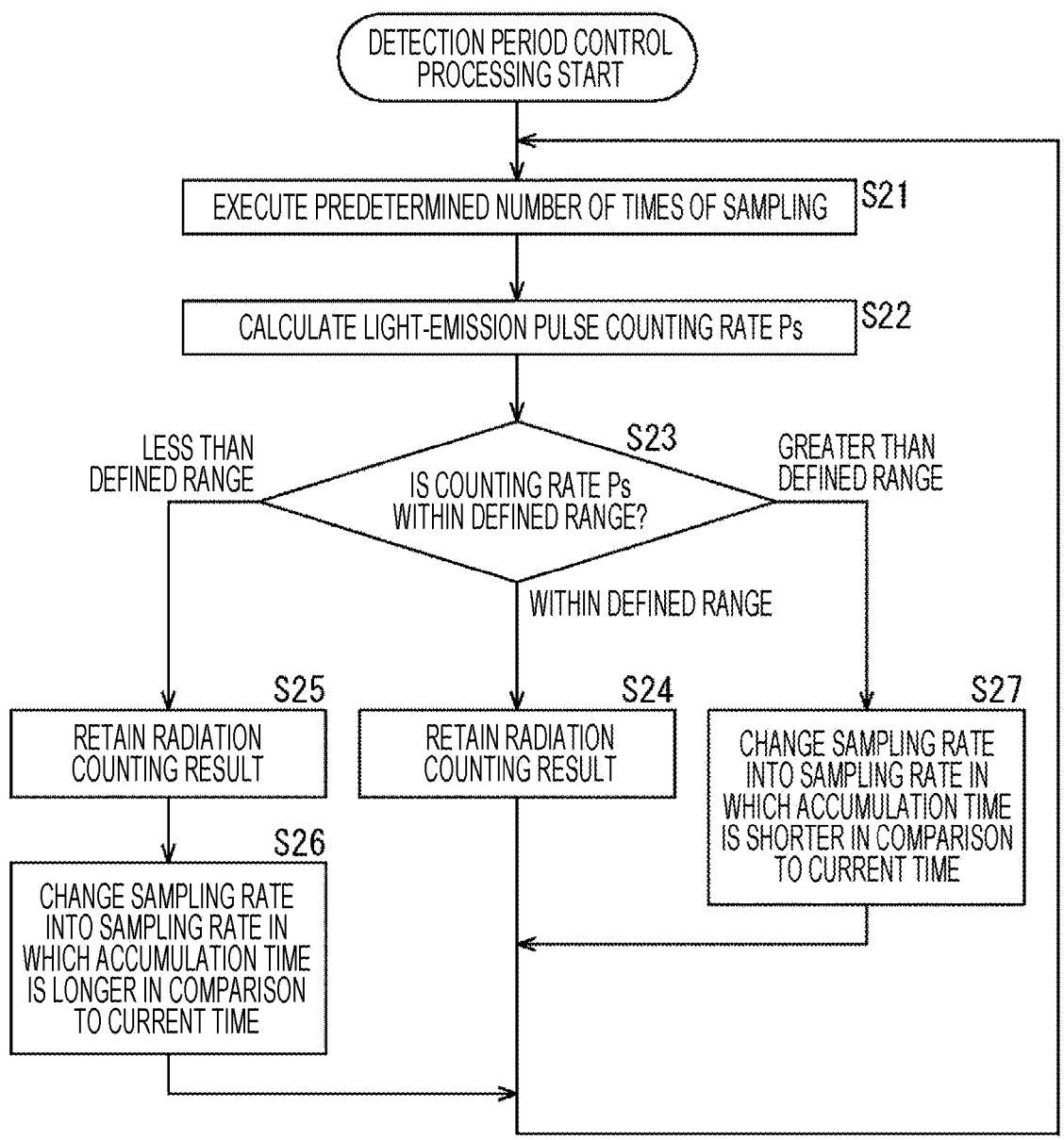
FIG. 16 is a flowchart illustrating detection cycle control processing of controlling a unit detection period.

FIG. 16 illustrates a flowchart of detection cycle control processing of controlling the unit detection period $T_{ACC}$ on the basis of an error occurrence rate that is permissible. For example, the processing is initiated when the radiation counter device 1 executes radiation counting.

First, in step S21, the radiation counter device 1 executes a predetermined number of times of sampling (that is, light-emission pulse detection) that is determined in advance at a predetermined sampling rate. For example, the optical detector 23 executes a total of 500 times of sampling at a sampling rate of 100 times/second. The data processing unit 12 performs radiation counting on the basis of a pixel output value transmitted from the optical detector 23. Furthermore, at the first step S21 of the detection cycle control processing, the optical detector 23 performs a predetermined number of times of sampling at an initial sampling rate that is determined in advance. In step S21 at the second time or later, a predetermined number of times of sampling is executed at a sampling rate corresponding to a processing result in step S24, S26, or S27 to be described later.

In step S22, the data processing unit 12 calculates the light-emission pulse counting rate Ps from the number of times at which the light-emission pulse is detected in the predetermined number of times of sampling executed in step S21. For example, in a case where the number of times at which the light-emission pulse is detected is 15 times among 500 times of sampling, the light-emission pulse counting rate Ps becomes 0.03 (3%).

In step S23, the data processing unit 12 determines whether or not the light-emission pulse counting rate Ps that is calculated is within a defined range. For example, in a case where the permissible error occurrence rate is determined as 3%, from the graph illustrated in B of FIG. 15, it can be seen that the corresponding light-emission pulse counting rate Ps becomes approximately 6%, and thus as the defined range of the light-emission pulse counting rate Ps, for example, a range of 3% to 6% is set in the output control circuit 57. In this case, the data processing unit 12 determines whether or not the light-emission pulse counting rate Ps that is calculated is within a range of 3% to 6%.

In step S23, in a case where it is determined that the light-emission pulse counting rate Ps that is calculated is within the defined range, the processing proceeds to step S24, and the data processing unit 12 retains a radiation counting result. The radiation counting result that is retained is used to derive an energy profile.

On the other hand, in step S23, in a case where it is determined that the light-emission pulse counting rate Ps that is calculated is less than the defined range, for example, in the above-described example in which the permissible error occurrence rate is determined as 3%, in a case where the light-emission pulse counting rate Ps that is calculated is 2%, the processing proceeds to step S25, and the data processing unit 12 retains a radiation counting result. In addition, in step S26, the data processing unit 12 changes the sampling rate into a sampling rate in which the accumulation time is further longer in comparison to current time, and supplies the sampling rate after change to the optical detector 23. When the accumulation time is lengthened, it is possible to reduce a data processing amount and power consumption.

On the other hand, in step S23, in a case where it is determined that the light-emission pulse counting rate Ps that is calculated is greater than the defined range, for example, in the above-described example in which the permissible error occurrence rate is determined as 3%, in a case where the light-emission pulse counting rate Ps that is calculated is 7%, the processing proceeds to step S27, and the data processing unit 12 changes the sampling rate into a sampling rate in which the accumulation time is further shorter in comparison to current time, and supplies the sampling rate after change to the optical detector 23. Accordingly in a case where it is determined that the light-emission pulse counting rate Ps that is calculated is greater than the defined range, the radiation counting result is discarded without being retained.

After step S24, S26, or S27, the processing returns to step S21, and the above-described processing in steps S21 to S27 is repeated.

The above-described detection cycle control processing is continuously executed until the radiation counter device 1 terminates the radiation counting, and is terminated when terminating the radiation counting, for example, by an instruction operation of a user, and the like.

As described above, according to the detection cycle control processing, the following control is executed. That is, when the light-emission pulse counting rate Ps that is calculated is less than the defined range, the accumulation time is lengthened to lower the sample rate, and when the light-emission pulse counting rate Ps that is calculated is greater than the defined range, the accumulation time is shortened to raise the sampling rate.

Figure 17:
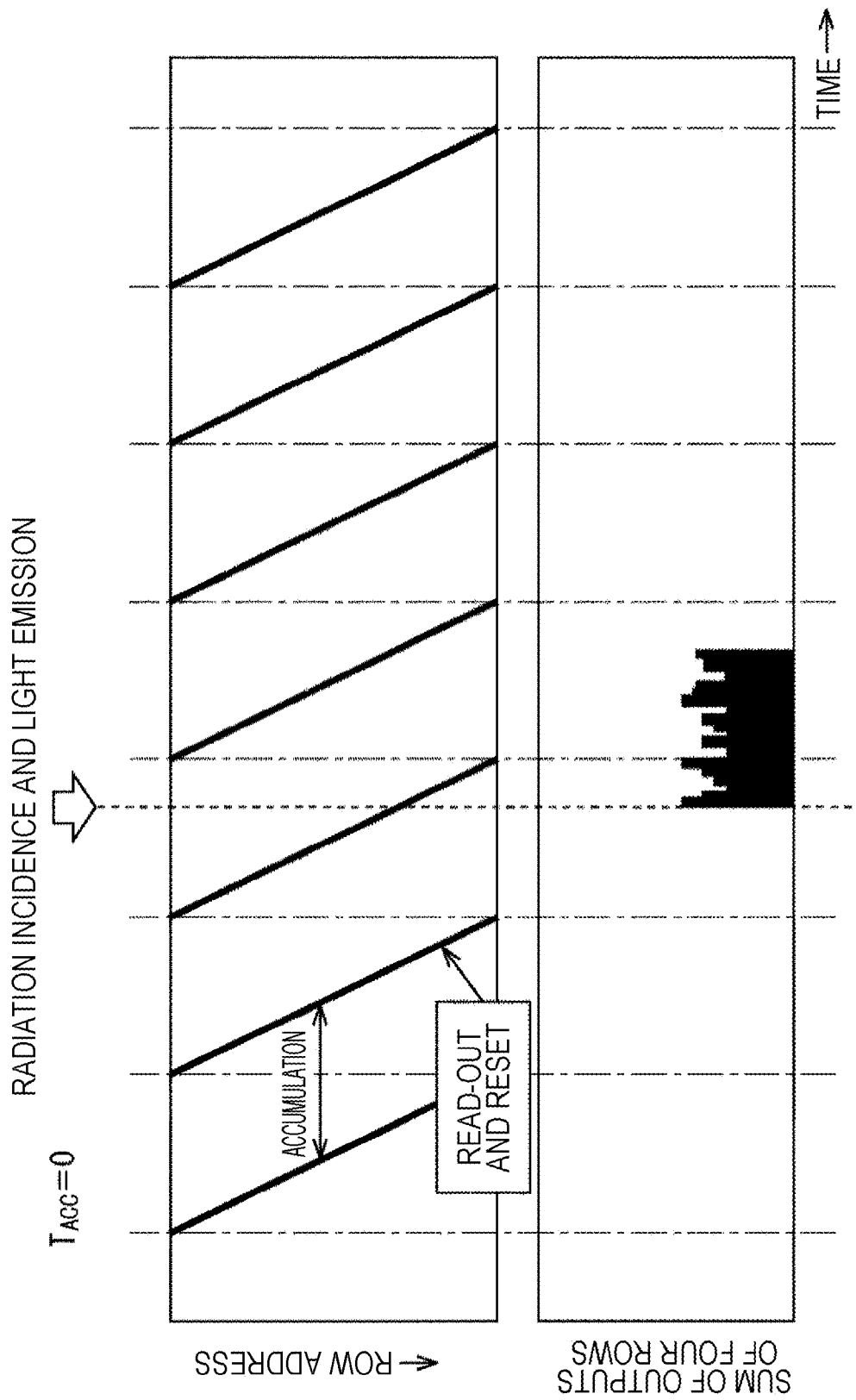
FIG. 17 is a view illustrating a control example of raising a sample rate.

Furthermore, the minimum value of the unit detection period $T_{ACC}$ is 0, and a timing chart at that time is illustrated in FIG. 17. In a case where a period of the read-out $T_{RD}$ of one frame is 0.8 milliseconds, the detection cycle becomes 0.8 milliseconds, and the sampling rate becomes 1,250 times/second.

Figure 18:
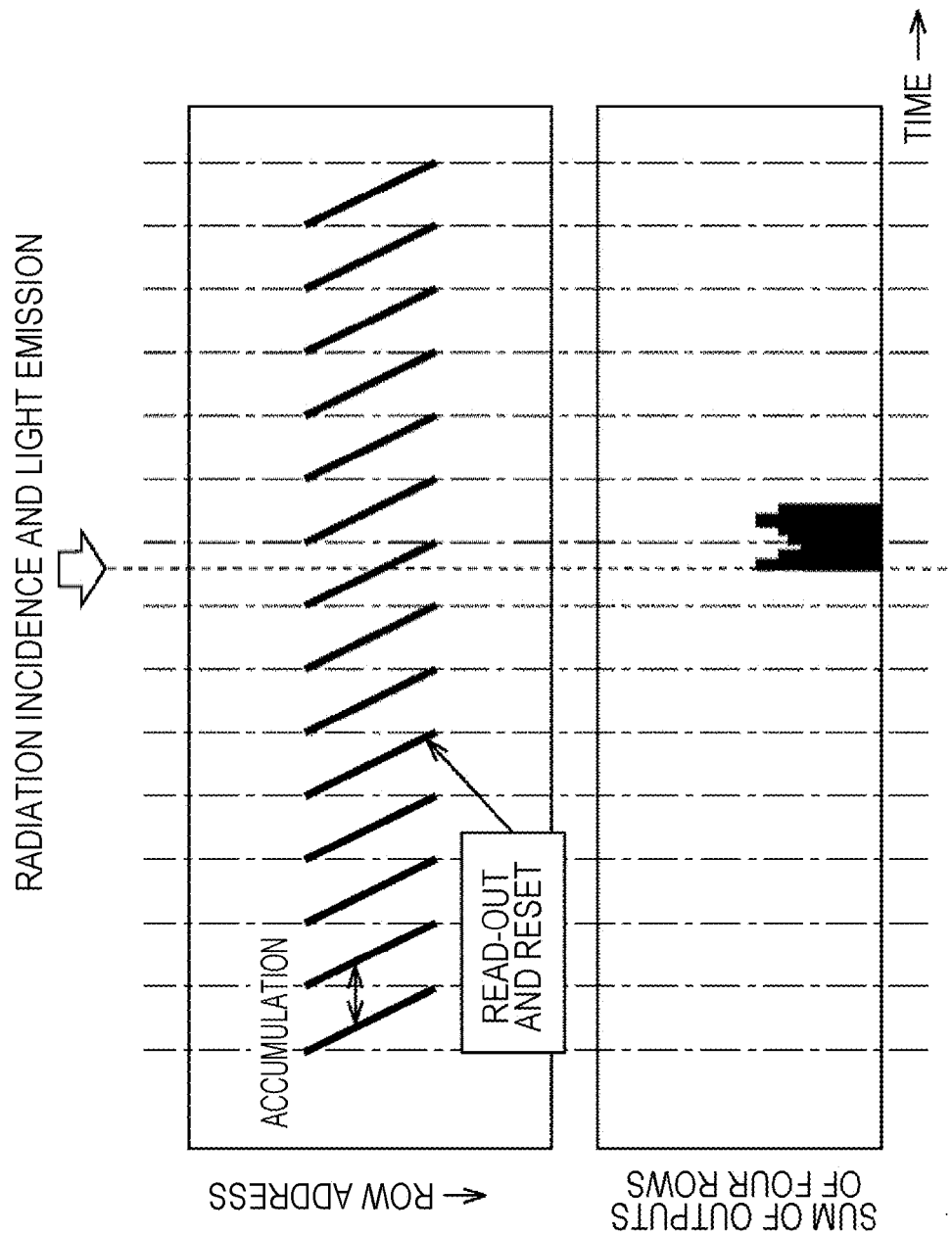
FIG. 18 is a view illustrating a control example of raising the sample rate.

In addition, as illustrated in FIG. 18, it is also possible to raise the sampling rate by setting only a part of pixel rows of the pixel array unit 51 to be used without using the entirety of the pixel rows. For example, it is assumed that with respect to the pixel array unit 51 of 200 rows in one frame, 50 times of read-out processing is executed with four-row collective access. In contrast, for example, a drive control is changed to use only 20 rows in the vicinity of the center of an opened surface, the read-out processing is terminated at five times. In the detection, only 10% of incident pulse light is detected, and thus energy resolution is weak but the sampling rate becomes 12,500 times/second that is ten times the sampling rate.

It is also considered that the light-emission pulse counting rate Ps that is calculated is determined as being greater than the defined range even in a state in which the sampling rate is raised by using only a part of pixel rows of the pixel array unit 51, and the like, and thus the sampling rate reaches the upper limit value of the radiation counter device 1. In this case, detection of energy becomes difficult.

However, even in a state in which the sampling rate reaches the upper limit value of the radiation counter device 1, in a case where it is determined that the light-emission pulse counting rate Ps that is calculated is greater than the defined range, it is possible to measure the amount of radiation by the following processing.

In the detection cycle control processing in FIG. 16, when light-emission pulse counting rate Ps corresponding to the upper limit value of the sampling rate is set, for example, to a first counting rate Ps_A1, in the radiation counter device 1, in addition to the counting rate Ps_A1, a second counting rate Ps_A2 greater than the counting rate Ps_A1 is set. Until the light-emission pulse counting rate Ps becomes the second counting rate Ps_A2, the data processing unit 12 of the radiation counter device 1 calculates the average number of times of light-emission λp from the light-emission pulse counting rate Ps that is calculated in accordance with the relational expression between the light-emission pulse counting rate Ps and the average number of times of light-emission λp illustrated in A of FIG. 15. For example, in a case where radiation is incident at the same frequency as the sampling rate, the light-emission pulse counting rate Ps become approximately 0.63, and the data processing unit 12 derives the average number of times of light-emission λp on the basis of the relational expression between the light-emission pulse counting rate Ps and the average number of times of light-emission λp.

On the other hand, in a case where the light-emission pulse counting rate Ps is greater than the second counting rate Ps_A2, the data processing unit 12 lowers the sampling rate, and derives an integrated amount of radiation.

That is, in a case of executing sampling in a state of lowering the sampling rate, when the number of rays of radiation, which is incident in each frame, is set as M, and an average of quantity-of-light integrated values of light-emission pulses is set as Ap, and a deviation is set as σp, the following relationships are satisfied.

$$Ap = \eta M$$

$$\sigma p = \eta \sqrt{M}$$

The number of incident radiation M in each frame is expressed by the following expression.

$$M = (Ap/\sigma p)^2$$

Accordingly, the data processing unit 12 acquires the number of rays of radiation M by using the average Ap of the quantity-of-light integrated values for every frame, and the deviation σp.

Description will be given of dose detection processing, which also includes detection of high amount of radiation, with reference to a flowchart in FIG. 19.

First, in step S41, the radiation counter device 1 executes a predetermined number of times of sampling that is determined in advance at a predetermined sampling rate, and calculates the light-emission pulse counting rate Ps.

In step S42, the radiation counter device 1 determines whether or not the light-emission pulse counting rate Ps that is calculated is equal to or less than the first counting rate Ps_A1.

In step S42, in a case where it is determined that the light-emission pulse counting rate Ps that is calculated is equal to or less than the first counting rate Ps_A1, the processing proceeds to step S43, and the radiation counter device 1 derives the quantity of light of the light-emission pulse (single pulse) that is detected. After step S43, the processing returns to step S41.

On the other hand, in step S42, in a case where it is determined that the light-emission pulse counting rate Ps that is calculated is greater than the first counting rate Ps_A1, the processing proceeds to step S44, and the radiation counter device 1 determines whether or not current sampling rate is the upper limit value of the radiation counter device 1.

In step S44, in a case where it is determined that the current sampling rate is not the upper limit value, the radiation counter device 1 raises the sampling rate, and the processing returns to step S41.

On the other hand, in step S44, in a case where it is determined that the sampling rate is the upper limit value, the processing proceeds to step S46, and the radiation counter device 1 determines whether or not the light-emission pulse counting rate Ps that is calculated is equal to or less than the second counting rate Ps_A2.

In step S46, in a case where it is determined that the light-emission pulse counting rate Ps that is calculated is equal to or less than the second counting rate Ps_A2, the processing proceeds to step S47, and the radiation counter device 1 calculates the average number of times of light-emission λp from the light-emission pulse counting rate Ps that is calculated in accordance with the relational expression between the light-emission pulse counting rate Ps and the average number of times of light-emission λp to derive the amount of radiation. After step S47, the processing returns to step S41.

On the other hand, in step S46, in a case where it is determined that the light-emission pulse counting rate Ps that is calculated is greater than the second counting rate Ps_A2, the processing proceeds to step S48, and the radiation counter device 1 lowers the sampling rate and derives an integrated amount of radiation. That is, the radiation counter device 1 derives the number of rays of radiation M by using an expression of $M=(Ap/\sigma p)^2$. In a case where the derived amount of radiation is equal to or greater than a predetermined value, deriving of the integrated amount of radiation in step S48 is repeated, and in a case where the derived amount of radiation is less than a predetermined value, the processing can return to the processing in step S41.

Figure 19:
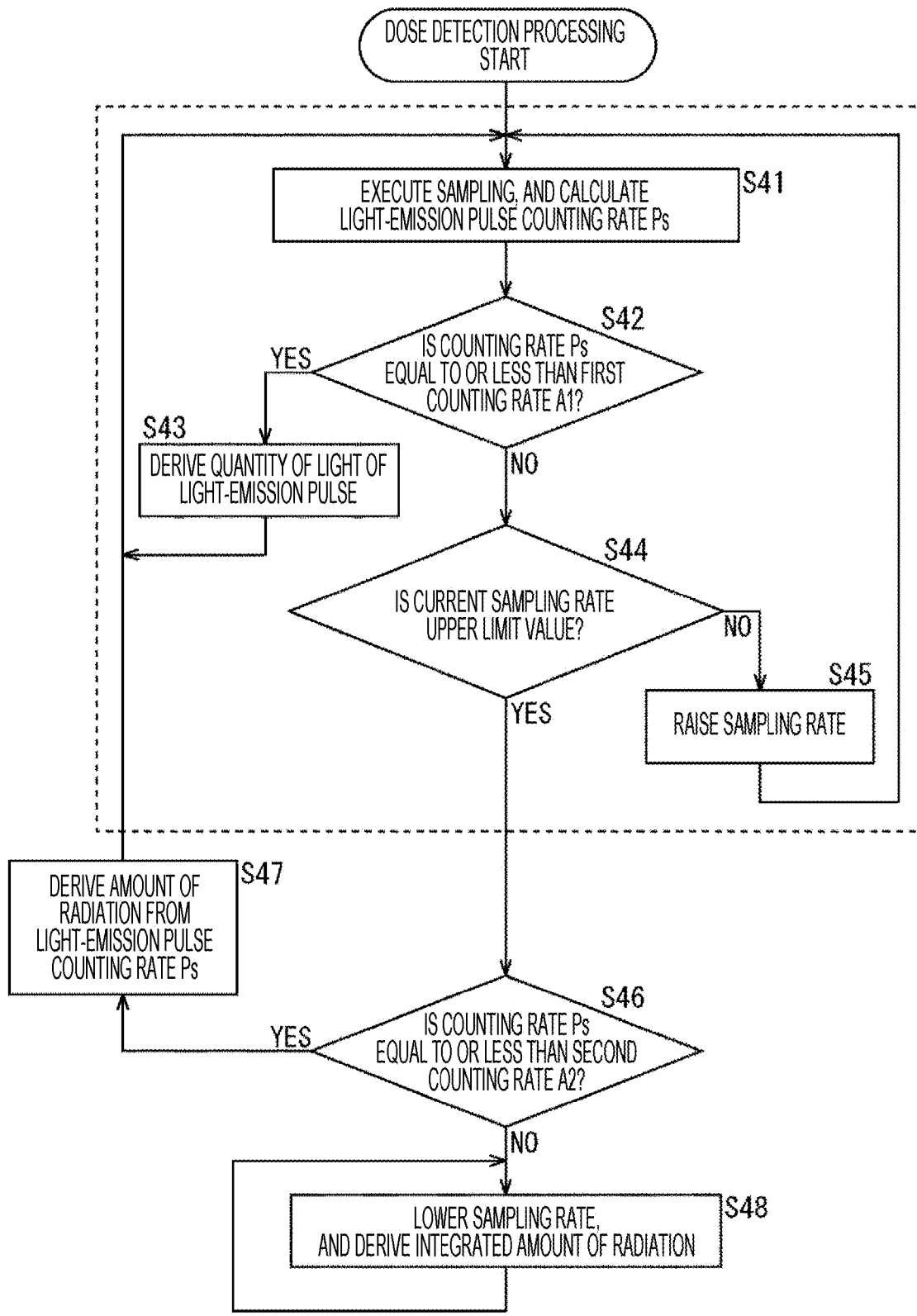
FIG. 19 is a flowchart illustrating dose detection processing.

In FIG. 19, processing in steps S41 to S45 which are surrounded by a broken line is a portion corresponding to the detection cycle control processing in FIG. 16.

As described above, as a countermeasure for a high amount of radiation, it is possible to detect the amount of radiation by the following process divided into three steps.

(1) First step in which the accumulation time is shortened so that the light-emission pulse counting rate Ps becomes equal to or less than the first counting rate Ps_A1 until the sampling rate reaches the upper limit value so as to raise the sampling rate.

(2) Second step in which the average number of times of light-emission $\lambda p$ is calculated from the light-emission pulse counting rate Ps that is calculated until the light-emission pulse counting rate Ps becomes the second counting rate Ps_A2 after the sampling rate reaches the upper limit value, and the amount of radiation is derived.

(3) Third step in which the amount of radiation is derived in an integral manner by using an expression of $M=(Ap/\sigma p)^2$ after the light-emission pulse counting rate Ps exceeds the second counting rate Ps_A2.

Furthermore, the accumulation time control method is not limited to the circuit configuration of the pixel 41 described with reference to FIG. 3, or the configuration of the optical detector 23. In a case where a pixel includes a photoelectric conversion element, an accumulation unit that accumulates a photo-electrically converted charge in the pixel, an output unit that outputs the charge in the accumulation unit at desired timing as a signal, and a reset unit that resets the charge in the accumulation unit, and the radiation counting is performed through sampling in a unit of reset of the pixel, charge accumulation, and read-out, the above-described accumulation time control method is applicable.

<Countermeasure Method in Case Where Pulse Light-Emission Occurs During Read-Out Period>

Next, description will be given of a countermeasure method in a case where pulse light-emission exists during a read-out period.

Figure 20:
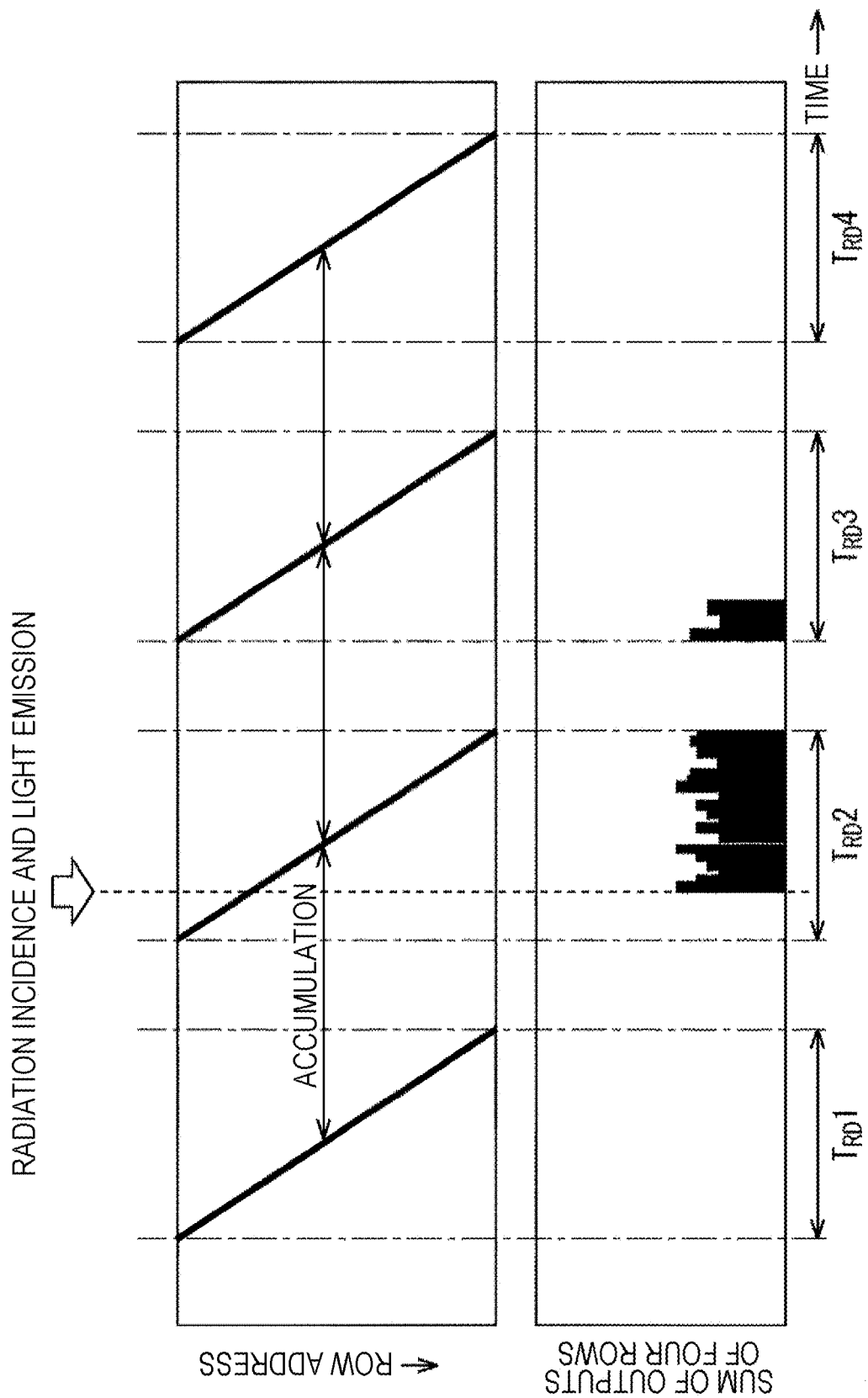
FIG. 20 is a view illustrating a pixel output example in a case where pulse light-emission exists during a read-out period.

FIG. 20 illustrates a pixel output example in a case where pulse light-emission exists during a read-out period.

In FIG. 20, a minute optical pulse is incident during a period of read-out $T_{RD}2$. In this state, the incident minute optical pulse is reflected on only an output of a part of pixels in one frame as an accumulation signal, and in the remaining pixels, the minute optical pulse is output as an accumulation signal in the subsequent period of read-out $T_{RD}3$. In a case where the amount of radiation is raised, and the unit detection period $T_{ACC}$ is shortened in the detection cycle control processing in FIG. 16 and the like, the above-described state occurs at a high frequency.

As a countermeasure against this case, the following two types can be considered.

(1) Introduction of determination processing of determining and extracting data corresponding to signal pulse light incident from a read-out data group (2) Introduction of a so-called global shutter in which an exposure period and a read-out period are independently controlled, and initiation and termination of exposure is performed with respect to the entirety of pixels Hereinafter, correspondence to the two types of (1) and (2) will be sequentially described.

<Determination processing of Determining and Extracting Data Corresponding to Single Pulse Light Incidence>

First, description will be given of a countermeasure method of (1), that is, the determination processing of determining and extracting data corresponding to signal pulse light incidence from a read-out data group.

With respect to a digital signal that is supplied from the optical detector 23, the data processing unit 12 determines presence or absence of a light-emission pulse and intensity thereof by using a plurality of continuous frames.

Figure 21:
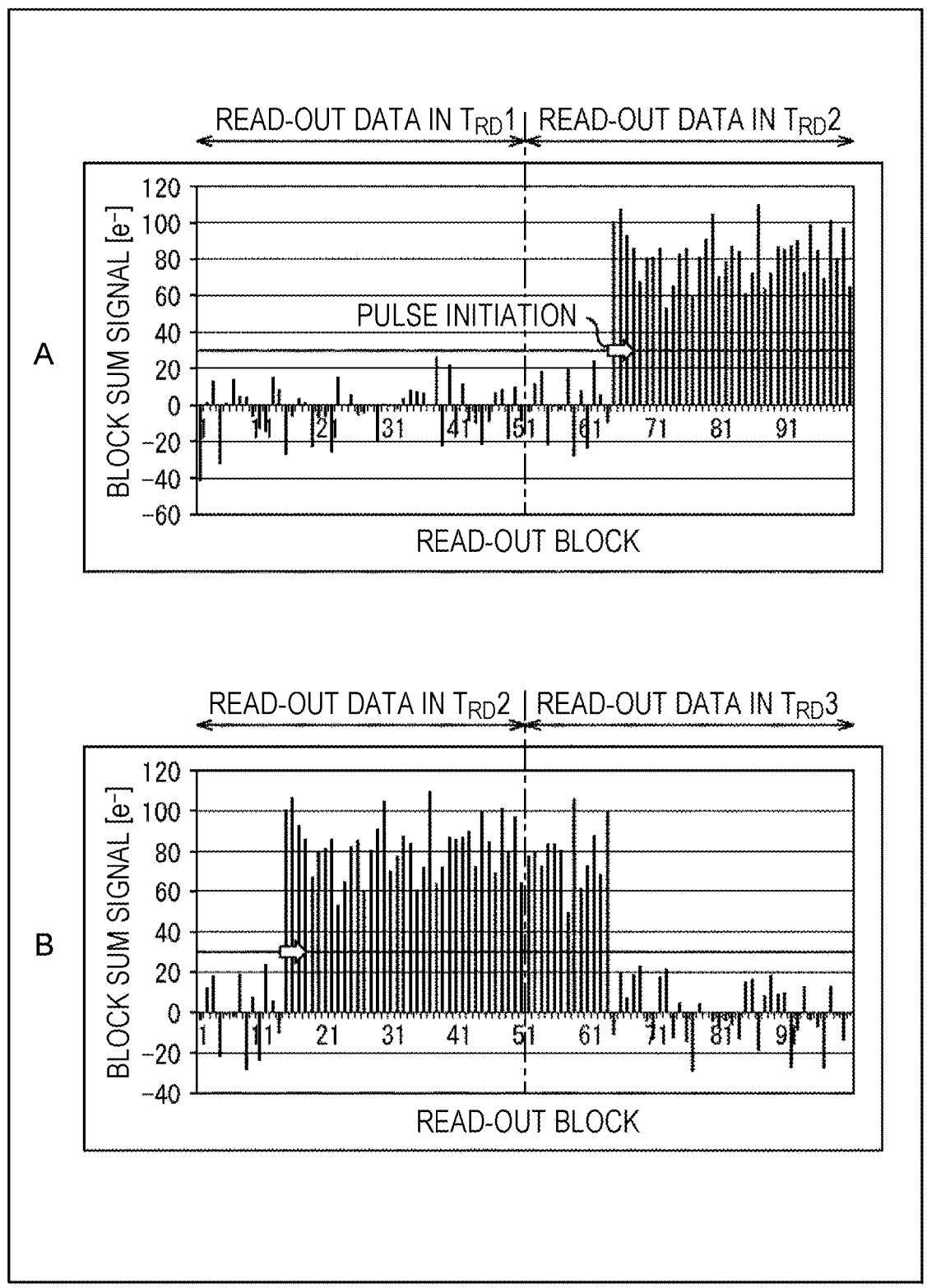
FIG. 21 is a view illustrating determination processing.

FIG. 21 illustrates read-out data corresponding to two frames when performing four-row collective read-out in a state in which four adjacent rows of the pixel array unit 51 are set as a read-out unit (block).

A of FIG. 21 represents read-out data in the read-out $T_{RD}1$ that is a first frame, and read-out data in the read-out $T_{RD}2$ that is a second frame. B of FIG. 21 represents read-out data in the read-out $T_{RD}2$ that is the second frame, and read-out data in the read-out $T_{RD}3$ that is a third frame.

Since four rows are set as a read-out unit (block), one frame is read out in a manner of being divided into 50 blocks, and two frames are set to data corresponding to 100 blocks.

When an average signal amount of a minute optical pulse that is incident to one pixel is set to 0.1 [e−], since the number of pixels in one block that is a read-out unit is 200*4=800 pixels, the average signal amount of one block when the minute optical pulse is incident is 80 [e−]. On the other hand, read-out noise is 0.5 [e−] per pixel, and thus floor noise of one block is $0.5*\sqrt{800}=14.14$ [e−]. An output of one block when the minute optical pulse is incident is expressed by the sum of the average signal amount and the read-out noise. Accordingly, in a case where an output of 80±14.14 [e−], that is, approximately 65 to 95 is obtained, it can be seen that the minute optical pulse is incident.

Here, for example, when observing an output in a block unit, in a case where one or the entirety of a plurality of continuous blocks exceed a defined determination threshold value, the data processing unit 12 regards the output as meaningful data, and makes a determination as initiation of output of the optical pulse.

Here, for example, the determination threshold value is set to 30 [e−] that is approximately $2\sigma$ of the floor noise, and in a case where four blocks continuously exceeds the defined determination threshold value, the data processing unit 12 makes a determination as output of the optical pulse. In this case, a probability that a block to which the optical pulse is not incident exceeds the determination threshold value is approximately 2.5%. In addition, in a state in which incidence of the optical pulse is not present, a probability that a state exceeding 30 [e−] occurs continuously over four blocks becomes $0.025^4=3.9E-7$, and thus this probability is negligible level.

When the read-out $T_{RD}2$ of the second frame is terminated, the data processing unit 12 executes determination processing by using read-out data in the read-out $T_{RD}1$ and read-out data in the read-out $T_{RD}2$.

In the determination processing at the time of read-out termination of the read-out $T_{RD}2$, a signal amount exceeds the determination threshold value at a $64^{th}$ block, and pulse output is initiated. However, even in a $100^{th}$ block, the signal amount exceeds the determination threshold value, and the pulse output is not terminated and continues across the subsequent frame (third frame). Accordingly, at this point of time, determination is suspended.

When read-out of the subsequent read-out $T_{RD}3$ is terminated, the data processing unit 12 executes the determination processing by using the read-out data in the read-out $T_{RD}2$ and the read-out data in the read-out $T_{RD}3$.

In the determination processing at the point of time of read-out termination of the read-out $T_{RD}3$, a signal amount at a $14^{th}$ block exceeds the determination threshold value, and pulse output is initiated. In addition, the pulse output is performed across a third frame and a fourth frame, and is stopped in the middle of the fourth frame. The data processing unit 12 performs quantity-of-light detection by adding signal amounts corresponding to 50 blocks (the number of blocks corresponding to one frame) from a pulse initiation position.

In the determination processing at the point of time of read-out termination of the subsequent read-out $T_{RD}4$, the determination processing is performed by using the read-out data of the third frame and the fourth frame. However, pulse output detection is initiated from the $14^{th}$ block that is a block in which pulse output termination is detected instead of performing pulse detection from the beginning (first block) of the third frame that is a previous frame.

In the above-described determination processing, the pulse output initiation position is detected, and the quantity-of-light detection is performed by adding signal amounts corresponding to a predetermined number of blocks from the initiation position that is detected, but the determination processing is not limited to the example, and a variation may exist. For example, processing of detecting pulse output termination by detecting that signal amounts of a plurality of blocks are continuously less than the determination threshold value after detecting initiation of pulse output, or of confirming that pulse output is terminated by detecting signal amounts with respect to the final four blocks ($97^{th}$ to $100^{th}$ blocks) of two frames, and the like may be added.

As described above, the data processing unit 12 specifies occurrence timing of data corresponding to a light-emission pulse by confirming a signal amount in a block unit that is read-out from the pixel array unit 51. In the above-described example, the occurrence timing is specified by comparing a signal amount of one block or across a plurality of blocks with the determination threshold value. The comparison with the determination threshold value is performed with respect to a plurality of blocks which are continuous or adjacent to each other, error detection is greatly reduced, and thus detection accuracy is improved.

Furthermore, the above-described error determination processing may be executed with respect to the data in a block unit, and a signal amount may be added after discarding error data. A signal amount corresponding to the discarded error data is corrected in the error determination processing, and is output.

<Access Sequence Capable of Realizing Global Shutter>

Next, description will be given of the countermeasure method of (2), that is, a method in which a non-selected pixel is not exposed during a read-out period by the global shutter.

Figure 22:
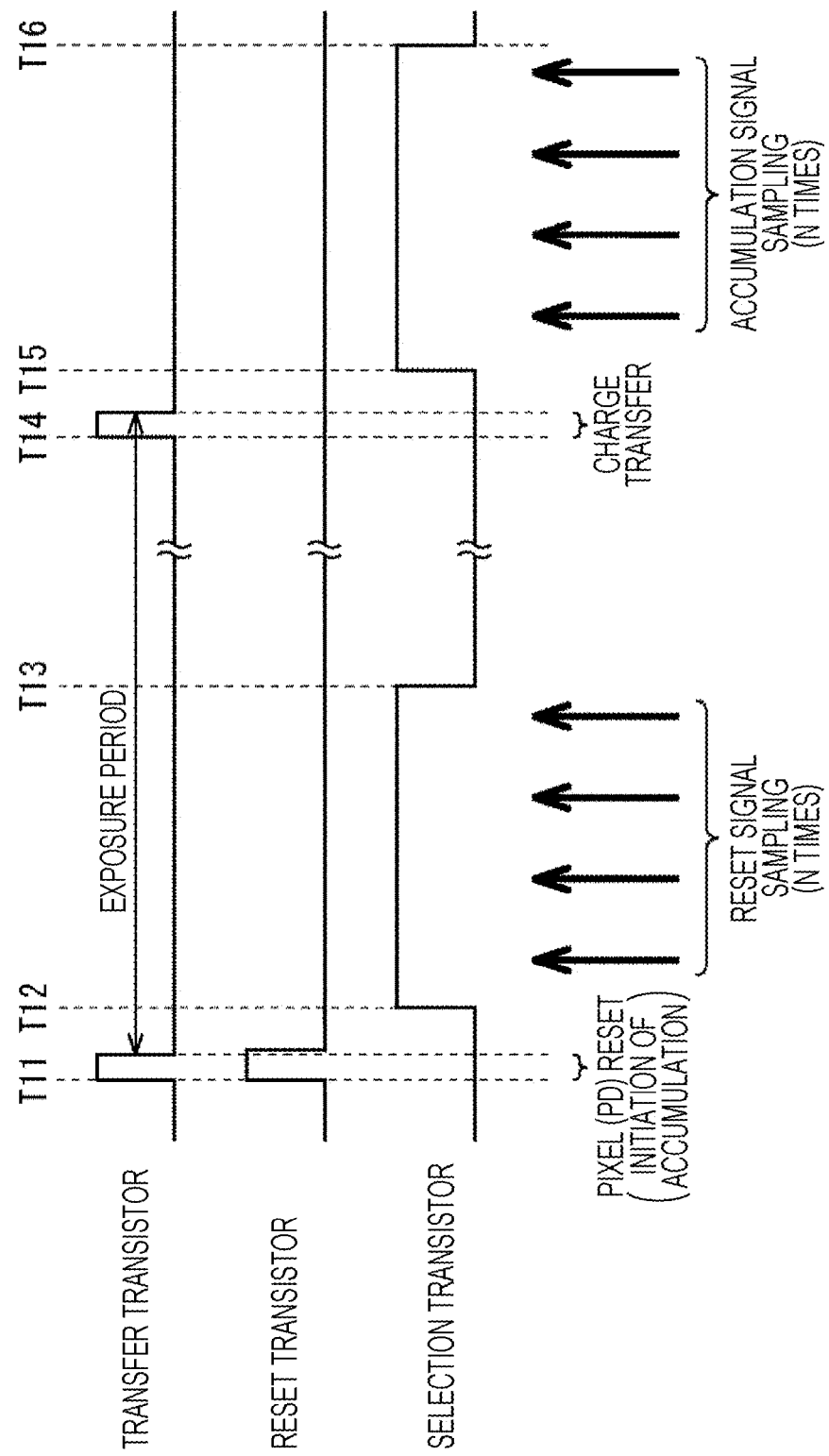
FIG. 22 is a timing chart illustrating an operation sequence of pixels performing global shutter.

FIG. 22 is a timing chart illustrating an operation sequence of the pixel 41 which is capable of realizing the global shutter.

First, the row drive circuit 54 performs the PD reset at timing T11 to initiate exposure. In addition, at timing T12 immediately after initiation of the exposure, the row drive circuit 54 controls the selection transistor 77 to be an ON-state. In addition, in a period up to the timing T13 at which the selection transistor 77 is controlled to be an OFF-state, the detection circuit 52 performs N times (for example, four times) of sampling of a reset signal. The sampling result of the reset signal is retained for every pixel for substitution of FD reset at timing T2 in FIG. 12 and the subsequent sampling of a reset signal.

At timing T14 immediately before termination of the exposure period, the row drive circuit 54 controls the transfer transistor 73 to be an ON-state. Due to the control, charges accumulated in the accumulation node 72 are transferred to the detection node 76.

At the subsequent timing T15, the row drive circuit 54 controls the selection transistor 77 to be an ON-state. In addition, in a period up to timing T16 at which the selection transistor 77 is controlled to be an OFF-state, the detection circuit 52 performs N times (for example, four times) of sampling of an accumulation signal.

In the read-out sequence, the exposure timing T11 and the exposure timing T14, and the timing T12 and the timing T15 of the signal sampling are independent from each other. Accordingly, for example, even in a case where a plurality of the pixels 41 share the detection circuit 52, it is possible to perform an operation of a so-called global shutter in which initiation and termination of exposure are performed simultaneously with respect to the entirety of read-out pixels, and are sequentially performed for every read-out pixel. When acquiring a difference between the reset signal and the accumulation signal for every pixel or for every pixel groups, it is possible to cancel the kTC noise that occurs during FD reset in each of the pixel 41 (here, the FD reset is simultaneously performed during the PD reset at the timing T11), and it is possible to acquire a net accumulation signal.

Furthermore, even in the operation sequence, it is possible to make an insensible period zero by omitting one time of PD reset.

Figure 23:
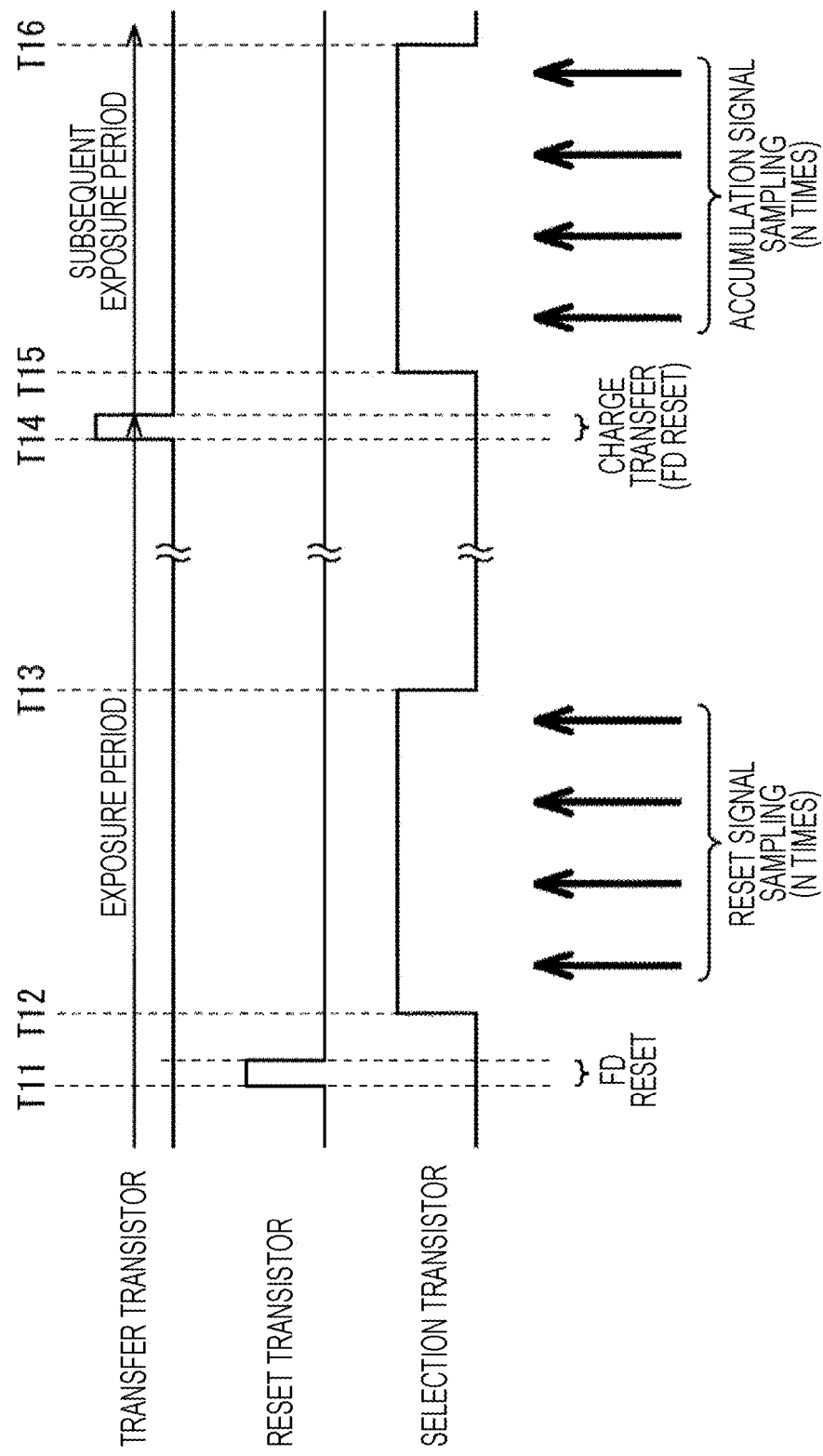
FIG. 23 is a timing chart in a case of a modification into a zero insensible period.

FIG. 23 is a timing chart in a case where the operation sequence in FIG. 22 is modified into a zero insensible period.

In this case, at timing T11, the transfer transistor 73 is not operated, only the reset transistor 75 is turned on, and only the FD (detection node 76) is reset while retaining charges of the photodiode 71. In addition, when charges of the photodiode 71 are transferred to the detection node 76 through charge transfer at timing T14, the exposure period is terminated, and the PD reset is performed simultaneously with the termination, and subsequent charge accumulation in the photodiode 71 is initiated. According to this, the pulse-light detection insensible period becomes zero, and an accumulation time becomes equal to the frame rate.

The operation sequence illustrated in FIG. 22 and FIG. 23 has the following characteristics.

(First process) Charges are discharged from the photodiode 71 of each of the pixels 41, and simultaneous exposure of the entirety of pixels is initiated.

(Second process) Next, the detection node 76 of each of the pixels 41 is reset.

(Third process) Next, a reset signal is read-out by the detection circuit 52 for every pixel 41.

(Fourth process) Next, an accumulation signal of the photodiode 71 is transferred to the detection node 76, and the simultaneous exposure of the entirety of the pixels is terminated.

(Fifth process) Finally, the accumulation signal is read-out by the detection circuit 52 for every pixel 41.

Here, in a case where the first process also functions as the fourth process, and the subsequent exposure is initiated after completion of the previous exposure, an operation sequence in which the insensible period is zero is realized.

2. Second Embodiment

Figure 24:
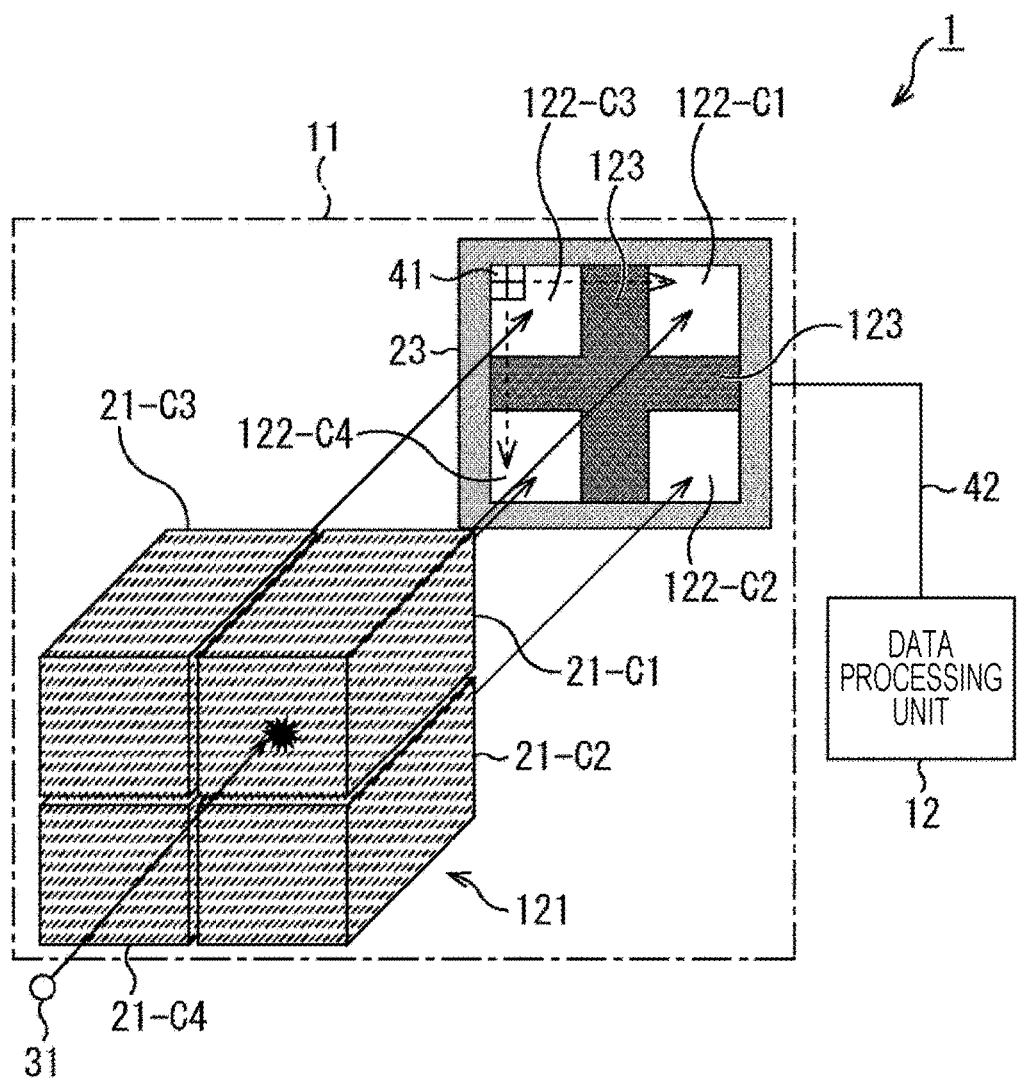
FIG. 24 is a view illustrating a configuration example of a second embodiment of the radiation counter device to which the present technology is applied.

FIG. 24 illustrates a configuration example of a second embodiment of the radiation counter device to which the present technology is applied.

FIG. 24 is a perspective view of a radiation counter device 1 of the second embodiment which corresponds to B of FIG. 1.

In FIG. 24, the same reference numeral is given to a portion corresponding to the first embodiment, and description thereof is appropriately omitted.

As in the first embodiment, the radiation counter device 1 of the second embodiment also includes the light-receiving unit 11 and the data processing unit 12.

In the first embodiment, one scintillator 21 is correlated to the optical detector 23, and scintillation light is diffused to the entirety of the surface in the opening of the optical detector 23.

In contrast, the radiation counter device 1 of the second embodiment includes a scintillator array 121 including four scintillators 21-C1 to 21-C4 with respect to the optical detector 23. The four scintillators 21-C1 to 21-C4 are optically separated from each other.

A light-receiving region of the optical detector 23 is divided into four regions 122-C1 to 122-C4 in correspondence with the four scintillators 21-C1 to 21-C4 of the scintillator array 121. In the light-receiving region of the optical detector 23, a light-shielding unit 123 is provided between regions 122 adjacent to each other. The light-shielding unit 123 prevents leaking out of light from a scintillator 21 other than the scintillators 21 corresponding to the four regions 122-C1 to 122-C4. Furthermore, the light-shielding unit 123 may be omitted.

According to this configuration, for example, a pulse light-emission photon, which is generated due to a gamma ray incident to the scintillator 21-C1 can reach only the corresponding region 122-C1. As is the case with the first embodiment, a plurality of pixels 41 are disposed in a two-dimensional lattice shape in each of the four regions 122-C1 to 122-C4, and reception of scintillation light is performed independently for each of the four regions 122-C1 to 122-C4.

The data processing unit 12 performs radiation counting, quantity-of-light measurement, energy determination, and the like, which are based on a digital signal supplied from the optical detector 23, for every region 122.

As described above, when the scintillator array 121 is correlated to the optical detector 23, it is possible to allow the optical detector 23 to have spatial resolution. It is also possible to allow the radiation counter device to have a configuration capable of improving the spatial resolution by tiling a set of the optical detector 23 and the scintillator array 121 (arranging a plurality of the sets in an array shape) in an X-Y direction.

Furthermore, in the example in FIG. 24, the scintillator array 121 includes the four (2×2) scintillators 21-C1 to 21-C4, but the number of the scintillator 21 arranged in the X direction (horizontal direction) and the Y direction (vertical direction) is not limited thereto. That is, it is possible to employ any configuration as long as a plurality of the scintillators 21 are arranged in the scintillator array 121.

3. Semiconductor Substrate Structure Example of Optical Detector

Figure 25:
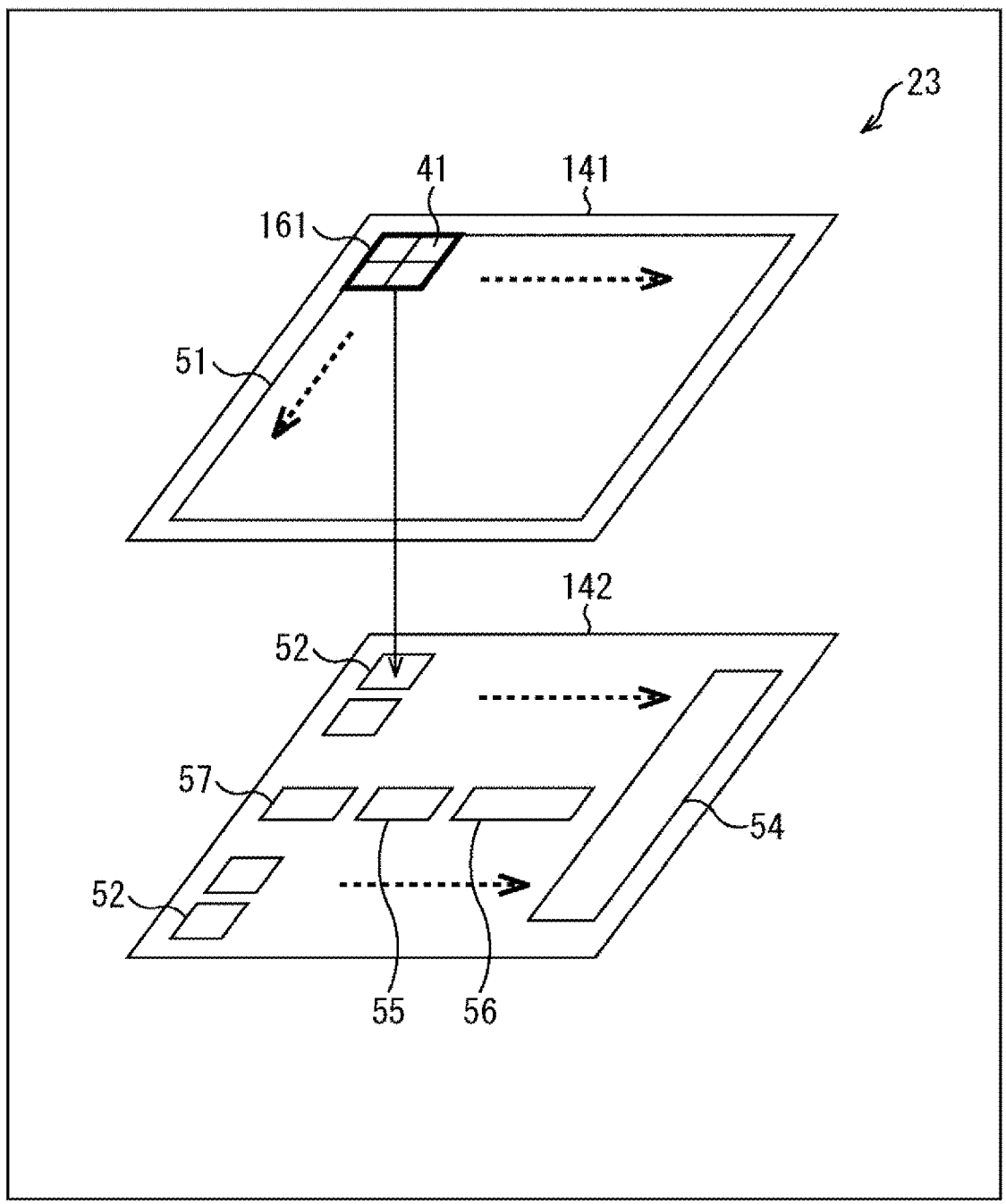
FIG. 25 is a view illustrating a semiconductor substrate structure example of an optical detector.

FIG. 25 illustrates a semiconductor substrate structure example of the optical detector 23.

The optical detector 23 can be formed in one sheet of semiconductor substrate (for example, a silicon substrate), but the optical detector 23 may be formed in two sheets of semiconductor substrates, for example, as illustrated in FIG. 25.

In FIG. 25, the optical detector 23 is constructed by a lamination structure of two sheets of semiconductor substrates including an upper substrate 141 and a lower substrate 142.

A pixel array unit 51 is formed in the upper substrate 141. On the other hand, a plurality of detection circuits 52, a row drive circuit 54, a reference voltage generation circuit 56, a timing control circuit 55, an output control circuit 57, and the like are formed in the lower substrate 142. The upper substrate 141 and the lower substrate 142 are laminated by using a substrate bonding technology such as silicon wafer lamination. In addition, the upper substrate 141 and the lower substrate 142 are electrically connected by metal coupling such as Cu—Cu bonding, a through-via, and the like.

For example, the plurality of detection circuits 52 are formed in the lower substrate 142 so that one of the detection circuits 52 corresponds to a pixel group 161 including four adjacent pixels in the pixel array unit 51. That is, the one detection circuit 52 of the lower substrate 142 is shared by a plurality of adjacent pixels 41 in the pixel array unit 51. Here, the pixel group 161 is constituted by the plurality of adjacent pixels 41 to correspond to a situation in which an abnormal value when radiation is directly incident occurs in a plurality of adjacent pixels.

Each of the detection circuits 52 sequentially AD-converts output signals of the pixels 41 in the corresponding pixel group 161, sums the resultant values, and supplies to the sum to the output control circuit 57. That is, in a case where one of the detection circuits 52 is provided with respect to the pixel group 161 including a plurality of adjacent pixels in the pixel array unit 51, the detection circuit 52 can perform AD conversion of the output signals of the pixels 41 in the pixel group 161 and processing of summing the output signals of the pixels 41 in the pixel group 161.

As is the case with the processing described with reference to FIG. 8, in the output control circuit 57, the comparator 101 compares output signals, which are supplied from the detection circuit 52, in a unit of the pixel group 161, and a threshold value that is read-out from the threshold value register 102, and determines whether or not the output signals in a unit of the pixel group 161 is an error. In a case where it is determined that the output signals in a unit of the pixel group 161 are greater than the threshold value and are error, the output signals are discarded.

In the output control circuit 57, the output signals of each of a plurality of the pixel groups 161 are summed, and are stored in the sum signal register 105. In addition, in a case where summation corresponding to one frame is terminated, the output signals, which are stored in the sum signal register 105, are supplied to the signal correction unit 106. The signal correction unit 106 corrects the output signals, which are supplied from the sum signal register 105, into output signals corresponding to one frame on the basis of an error count value supplied from the error counter 103, and outputs the resultant output signals to a rear stage side.

As described above, since the optical detector 23 is constituted by a lamination structure of two sheets of semiconductor substrates, a ratio (aperture ratio) of the pixel array unit 51 in the optical detector 23 is raised, and thus it is possible to improve energy resolution. According to this, even in a case where a large-sized scintillator 21 is disposed on a front surface of a light-receiving surface of the optical detector 23, it is possible to receive the majority of scintillation light, and it is possible to raise radiation sensitivity. Particularly, it is possible to raise a yield ratio of light in a case of performing tiling.

Even in a use as illustrated in FIG. 24, when a fringe portion other than an opening is minimized, it is possible to perform tiling at a uniform opening while narrowing a width of the light-shielding unit 123. A quantum efficiency of the large-sized semiconductor pixel is close to 100%, and thus energy resolution in a plurality of uses is comparable to energy resolution of a high electron multiplier tube.

Mass production of the optical detector 23 can be realized by the same manufacturing line and in a similar manufacturing process as in a CMOS image sensor. The radiation counter device 1 manufactured in this manner is small in size and is light in weight, is strong against an environmental fluctuation, and is stable in characteristics. Accordingly, maintenance of the radiation counter device 1 is also easy. In addition, an output of the radiation counter device 1 is a digital signal. Accordingly, a circuit on a rear stage may process only a digital signal, is less likely to be susceptible to noise from the periphery, and thus it is possible to easily process data output from a plurality of light-receiving units.

Furthermore, in the above-described example, in the lower substrate 142, one detection circuit 52 is provided with respect to the pixel group 161 including the four adjacent pixels in the pixel array unit 51, but the detection circuit 52 may be formed in a pixel unit. In this case, for example, one frame is 16 μs, and the entirety pixels are collectively read-out once in one frame. In addition, an output signal of each of the pixels 41 is compared with a threshold value in one pixel unit to determine whether or not the output signal is an error.

4. Another Configuration Example of Pixel Circuit

Figure 3:
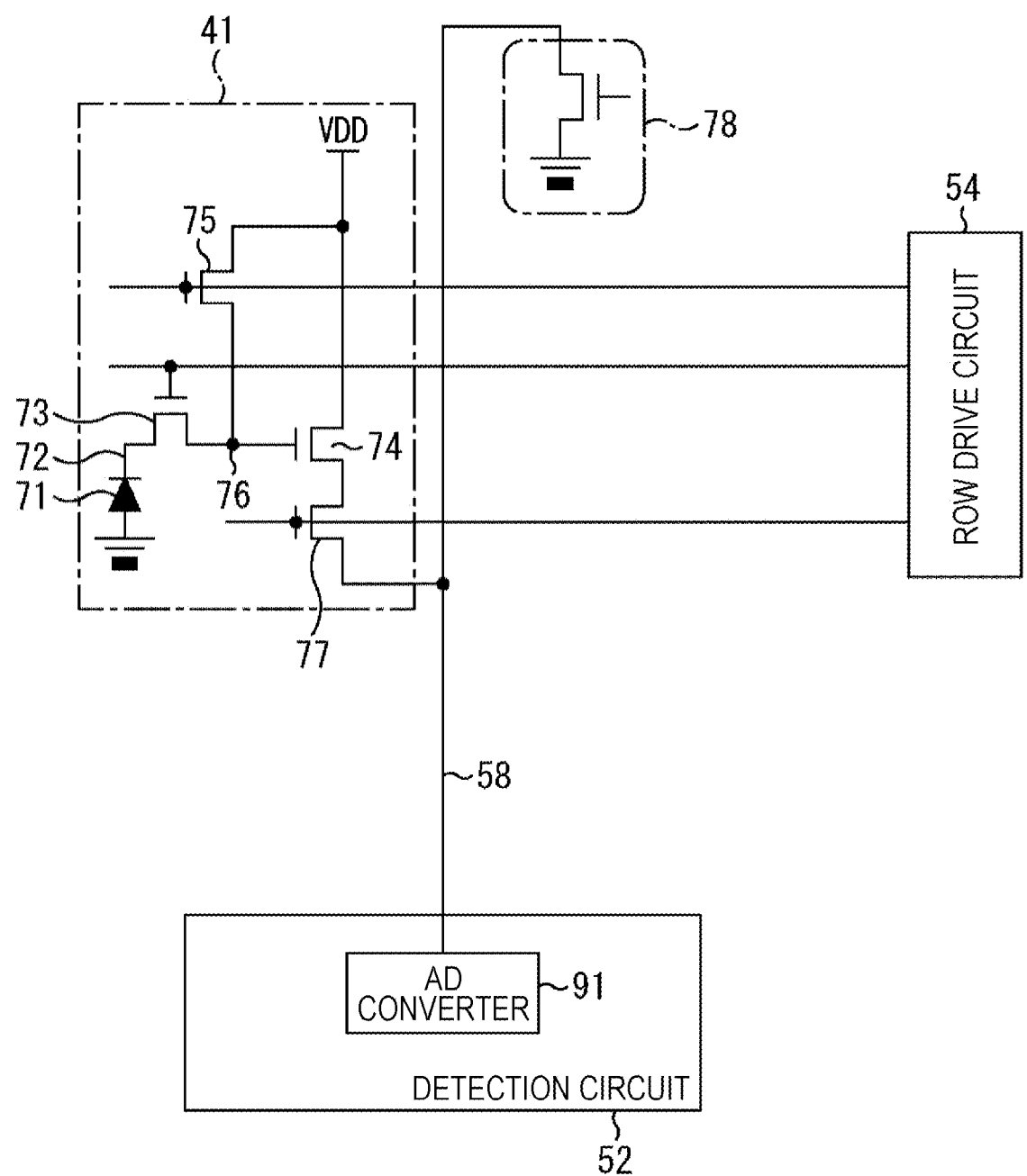
FIG. 3 is a view illustrating a circuit configuration of pixels.

The circuit configuration of the pixel 41 illustrated in FIG. 3 may be employed frequently as a configuration in a CMOS image sensor for a camera.

In weak optical pulse detection such as scintillation, it is advantageous to increase an area of the photodiode 71 as much as possible. On the other hand, due to the increase in the area of the photodiode 71, it is difficult to drift charges, which occur in the photodiode 71 through photoelectric conversion, to collect the charges in a one electron level. In a case where a non-collected charge remains in the photodiode 71, the charge deteriorates quantity-of-light detection accuracy, and the charge becomes the cause for noise occurrence in the subsequent detection. The non-collected charge occurs when a charge is trapped into a potential dip caused by a deviation in a concentration of impurities in the photodiode 71 in any probability. When the size of the photodiode 71 increases and thus an internal electric field thereof becomes weak, the trapping probability increases.

For example, it is assumed that charges remains in the photodiode 71 in an average of 5% in the entirety of pixels of the pixel array unit 51. In a case where the optical detector 23 performs signal pulse-light detection with the pixel array unit 51, the quantity of light detected at the point of time at which pixel outputs are summed is approximately equivalent to a case where the number of effective incident photons N decreases by 5%. This is meaningful, but if this state is always stable, correction can be made. Accordingly, deterioration in a deviation is present only to a certain extent corresponding to a decrease in the number of effective incident photons N. Substantially, this case is rarely problematic.

On the other hand, in a case where the charge remains also in the subsequent detection, the potential dip can be filled with a trapped charge, and thus a trapping probability decreases by the filling. In addition, trapped charges are diffused and begin to be discharged. That is, quantum efficiency fluctuates with the elapse of time, and floor noise becomes weak.

In consideration of the above-described circumstance, even in a case where residual charges, which cannot collected as a signal, slightly exist in the photodiode 71, if a unit capable of completely removing the residual charges during PD reset is provided, it is considered that it is possible to enable pulse-light detection to effectively function.

Figure 26:
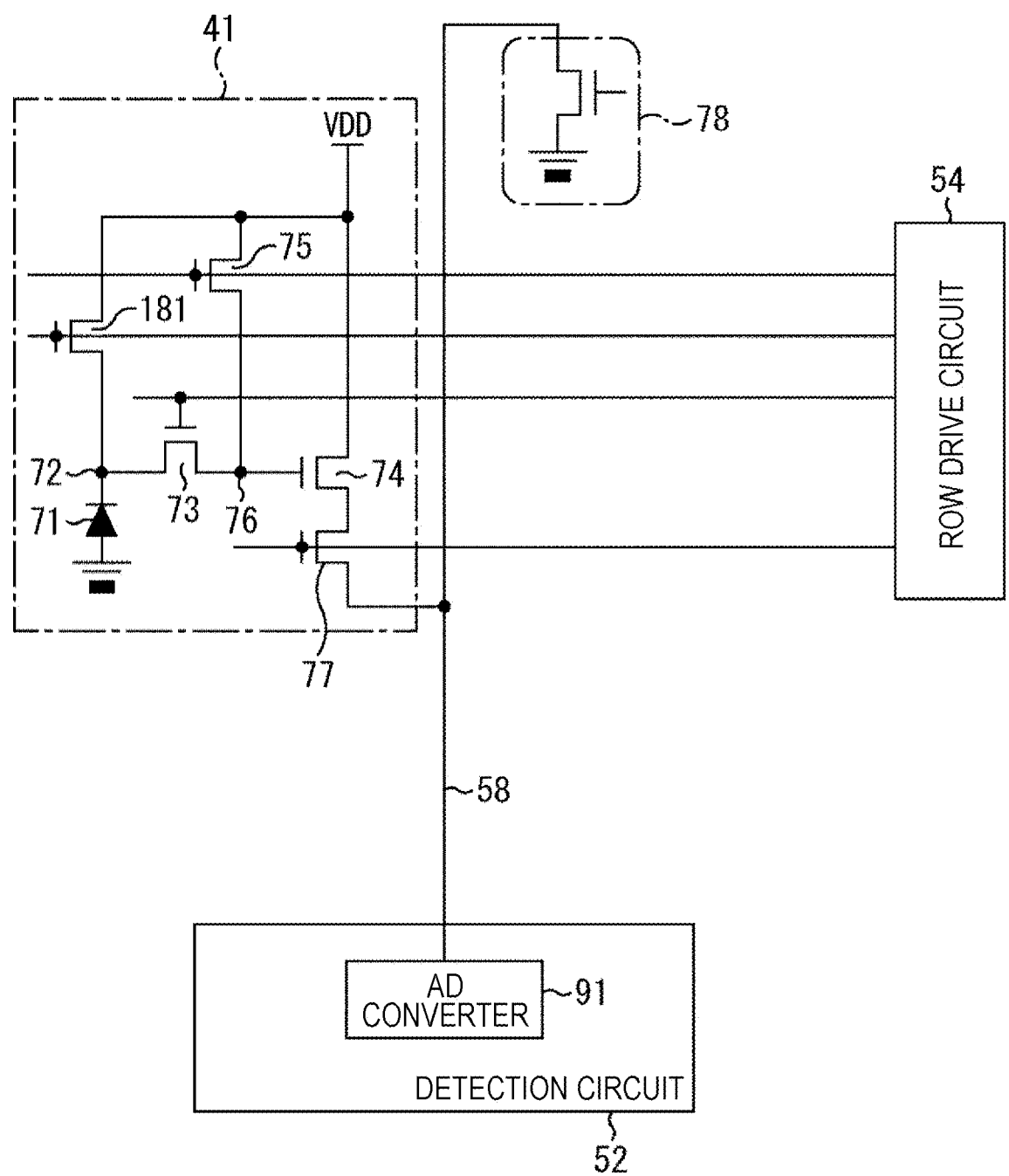
FIG. 26 is a view illustrating another circuit configuration of pixels.

FIG. 26 illustrates a circuit including a unit capable of completely removing charges which slightly exist in the photodiode 71 during the PD reset as another circuit configuration of the pixels 41.

In FIG. 26, the same reference numeral will be given to a portion corresponding to FIG. 3, and description thereof will be appropriately omitted.

When comparing the pixel circuit in FIG. 26 with the pixel circuit in FIG. 3, in a pixel 41 in FIG. 26, in addition to the reset transistor 75 as a first reset transistor, a second reset transistor 181 configured to discharge residual charges in the photodiode 71, is added.

That is, the pixel 41 in FIG. 26 includes the photodiode 71, the transfer transistor 73, the detection node 76, and the amplification transistor 74 that amplifies a signal of the detection node 76 and outputs the resultant signal. In addition, the pixel 41 further includes the first reset transistor 75 that connects the detection node 76 to the power supply VDD, and the second reset transistor 181 that is directly connected to the photodiode 71 and is connected to the power supply VDD.

Figure 27:
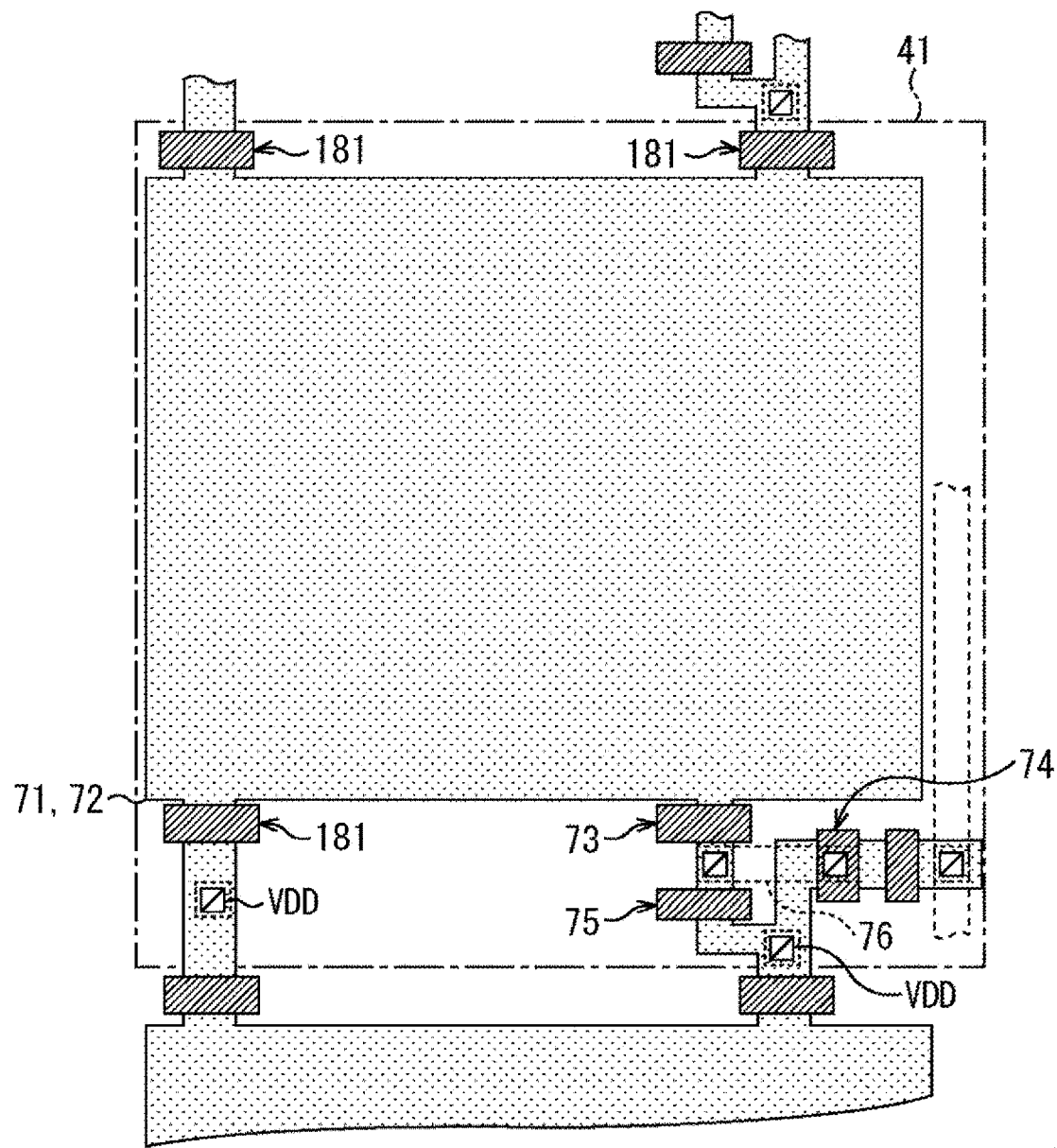
FIG. 27 is a view illustrating planar arrangement of the pixel circuit in FIG. 26.

FIG. 27 illustrates planar arrangement of the pixel circuit illustrated in FIG. 26.

One piece of the second reset transistor 181 may be provided. However, as illustrated in FIG. 27, a plurality of the second reset transistors 181 may be provided so as to completely discharge residual charges in the photodiode 71 having a large area. The second reset transistor 181 does not have an effect on a parasitic capacitance of the detection node 76, and thus flexible multiple arrangement is possible.

Figure 28:
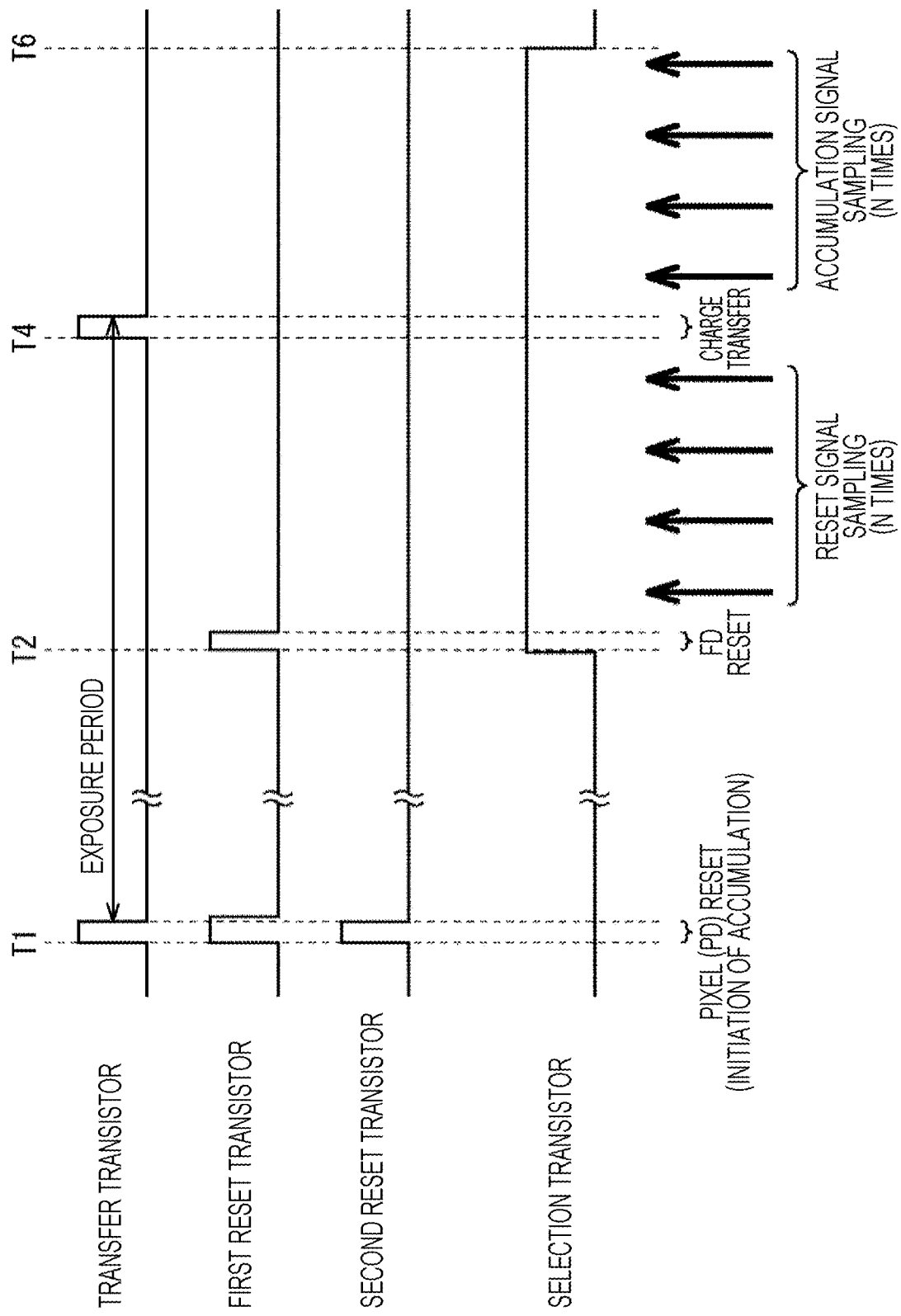
FIG. 28 is a timing chart illustrating an operation sequence of the pixel circuit in FIG. 26.

FIG. 28 is a timing chart illustrating an operation sequence of the pixel circuit illustrated in FIG. 26.

The operation sequence is different from the operation sequence illustrated in FIG. 12 in that the second reset transistor 181 that is additionally added is controlled to be an ON-state at the timing T1 at which the PD reset is performed. According to this, the residual charges in the photodiode 71 are completely discharged. The other operations are similar to the operations described with reference to FIG. 12.

Furthermore, the timing at which the second reset transistor 181 is turned on may be any timing other than an exposure period.

Even in the pixel circuit illustrated in FIG. 26, "ON" of the transfer transistor 73 in the fourth process also functions as the PD reset in the first process, and the operation sequence in which the insensible period is zero is realized.

Figure 29:
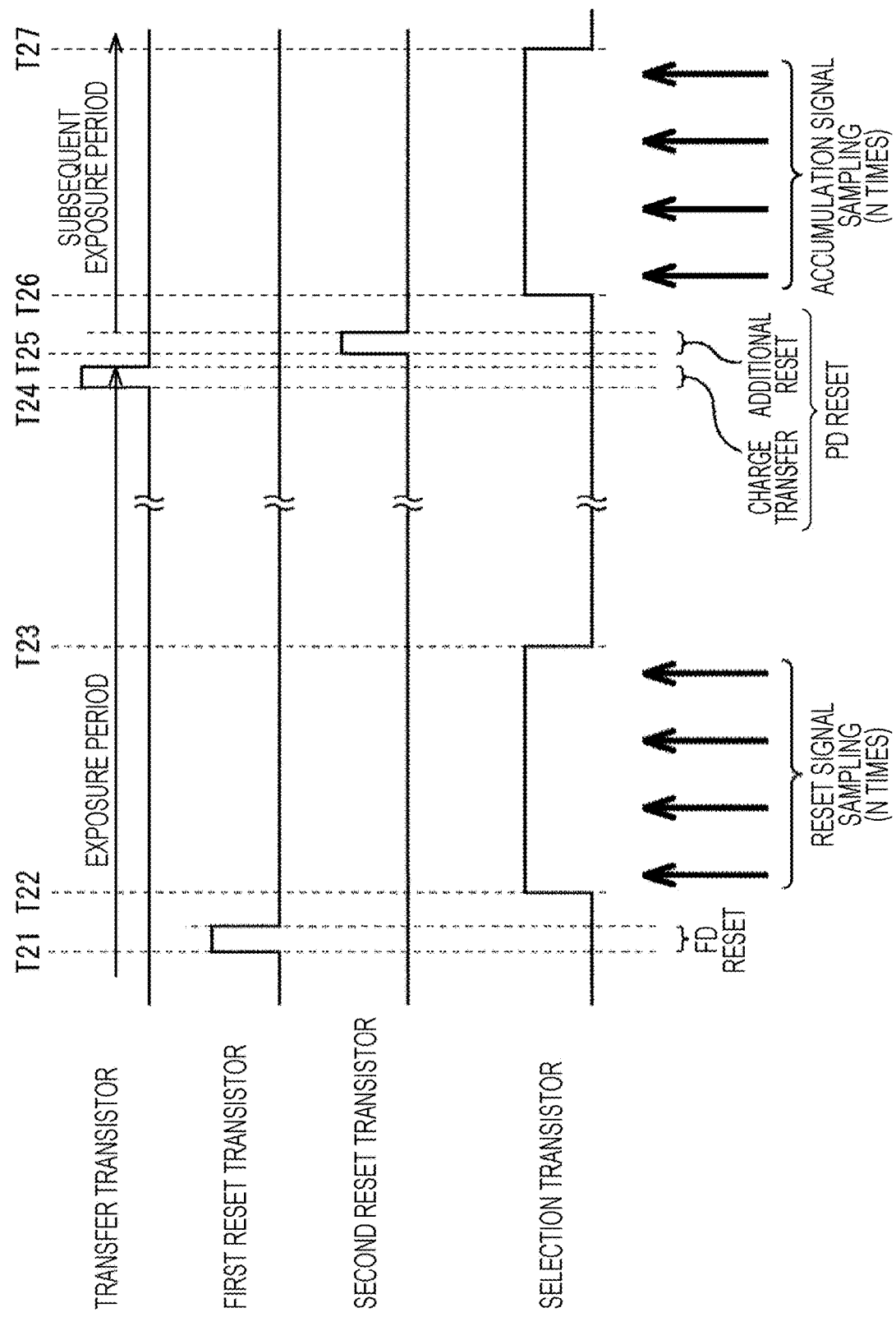
FIG. 29 is a timing chart illustrating an operation sequence of the pixel circuit in FIG. 26 in a case of a zero insensible period.

FIG. 29 is a timing chart illustrating an operation sequence of the pixel circuit in FIG. 26 in a case of a zero insensible period.

In a case of the zero insensible period, the second reset transistor 181 may be turned on at the same timing T24 at which the transfer transistor 73 is turned on. However, the second reset transistor 181 may be turned on before or after the timing T24, or in continuity to turning-on of the transfer transistor 73. FIG. 29 illustrates a control example in which the second reset transistor 181 is turned on after turning-on of the transfer transistor 73.

First, at timing T21, only the first reset transistor 75 is turned on, and FD reset is performed.

Then, at timing T22, the row drive circuit 54 controls the selection transistor 77 to be an ON-state, and the detection circuit 52 performs N times (for example, four times) of sampling of a reset signal between the timing T22 and timing T23 at which the selection transistor 77 is controlled to be an OFF-state. The detection circuit 52 retains a sampling result of the reset signal for every pixel.

Next, at timing T24, the row drive circuit 54 controls the transfer transistor 73 to be an ON-state. Due to the control, charges accumulated in the accumulation node 72 are transferred to the detection node 76.

After the transfer transistor 73 are changed into the OFF-state, at timing T25, the row drive circuit 54 controls the second reset transistor 181 to be an ON-state. Due to the control, charges in the photodiode 71 are completely discharged. The exposure period is terminated at the point of time at which the transfer transistor 73, which is turned on at the timing T24, is controlled to be the OFF-state, and the subsequent exposure period is initiated from time at which the second reset transistor 181, which is turned on at the timing T25, is changed into the OFF-state.

Then, at timing T26, the row drive circuit 54 controls the selection transistor 77 to be an ON-state. In addition, the detection circuit 52 performs N times (for example, four times) of sampling of an accumulation signal between the timing T26 and timing T27 at which the selection transistor 77 is controlled to be an OFF-state. The detection circuit 52 retains a sampling result of the accumulation signal for every pixel. In addition, a net accumulation signal, which is indicated by a difference between the reset signal and the accumulation signal, is derived by the detection circuit 52 for every pixel.

As described above, in a case where the PD reset is omitted, and charge transfer at the time of read-out is combined with discharge of charges in the photodiode 71, discharge by the second reset transistor 181 may be also performed immediately after the charge transfer by the turning-on of the transfer transistor 73.

In the operation sequence illustrated in FIG. 29, the read-out sequence and the exposure timing are independent from each other to enable flexible timing setting. According to this, even in a case where the detection circuit 52 is shared by a plurality of pixels, it is possible to introduce a so-called global shutter in which initiation and termination of exposure of the entirety of pixels are simultaneously performed.

That is, in the pixel 41, the transfer transistor 73 and the second reset transistor 181 are turned on in synchronization with each other, and accumulated charges in the photodiode 71 are discharged by using the transfer transistor 73 and the second reset transistor 181. More typically, the pixel 41 discharges accumulated charges in the photodiode 71 by using a plurality of transistors which are directly connected to the photodiode 71 in a synchronization manner.

Furthermore, typically, the size of the photodiode 71 on which the second reset transistor 181 is necessary to be mounted is 100 $\mu m^2$ or greater.

5. Another Application Example of Optical Detector

The optical detector 23 that detects weak optical pulse is also applicable to a device other than the above-described radiation counter device. Here, as an example in which the optical detector 23 is applied to a device other than the radiation counter device, a biological testing device will be described.

Figure 30:
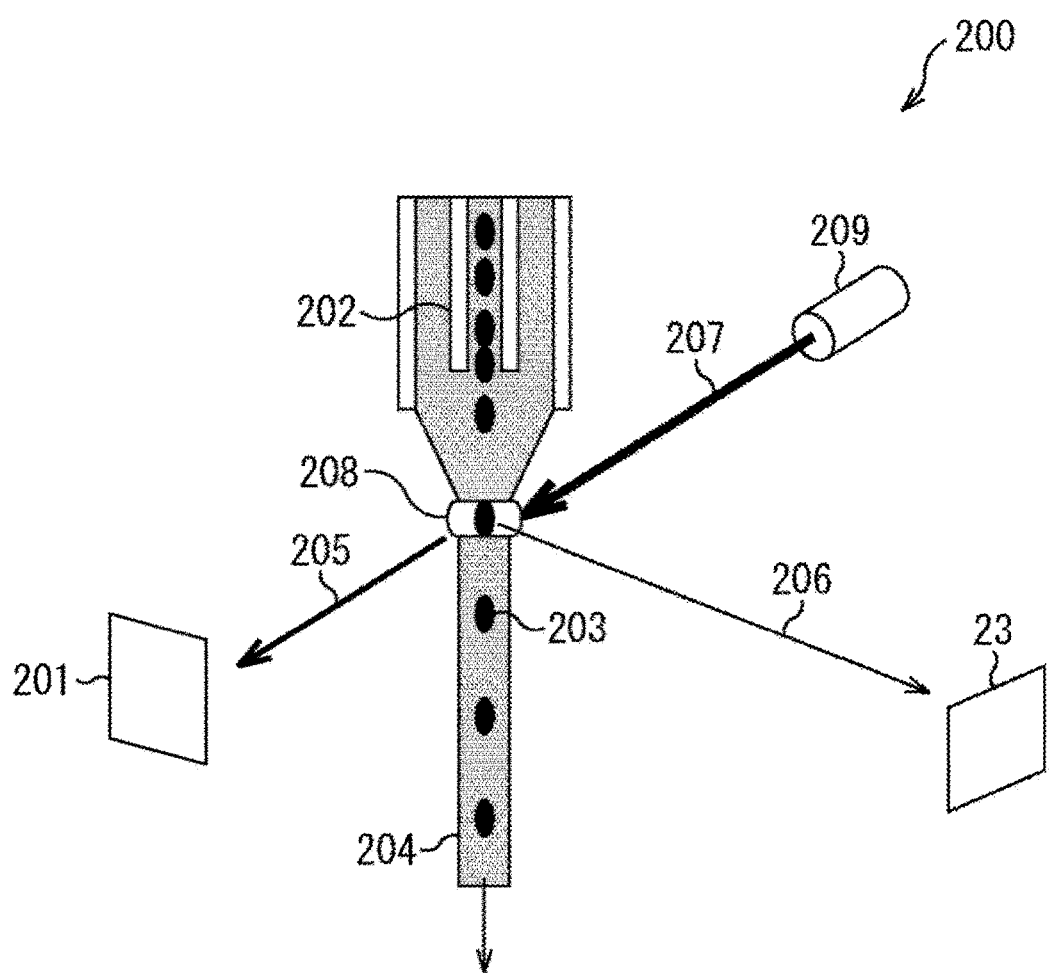
FIG. 30 is a view illustrating a configuration example of a flow cytometer as a biological testing device to which the present technology is applied.

FIG. 30 illustrates a configuration example of a flow cytometer as the biological testing device to which the present technology is applied.

The flow cytometer 200 includes at least a photodiode 201 that detects forward-scattered light 205, and an optical detector 23 that detects sideway-scattered light or fluorescence 206 that is emitted from a fluorescent marker that is attached to specimens 203.

The specimens 203 such as a cell that flows from a sample tube 202 are arranged in a line in a sample flow 204 and are irradiated with laser light 207 from a laser light source 209. When each of the specimens 203 passes through an irradiation spot 208 of the laser light 207, fluorescence 206 that is excited from the fluorescent marker and the like and scattered light occur. Forward-scattered light 205 having a large quantity of light is received by the photodiode 201, the magnitude of the specimen 203 is detected, and specimen passing timing is acquired, and thus an event signal thereof is generated. On the other hand, the fluorescence 206 emitted from the fluorescent marker attached to the specimen 203, or the sideway-scattered light become weak pulse light, and is detected by the optical detector 23.

Figure 31:
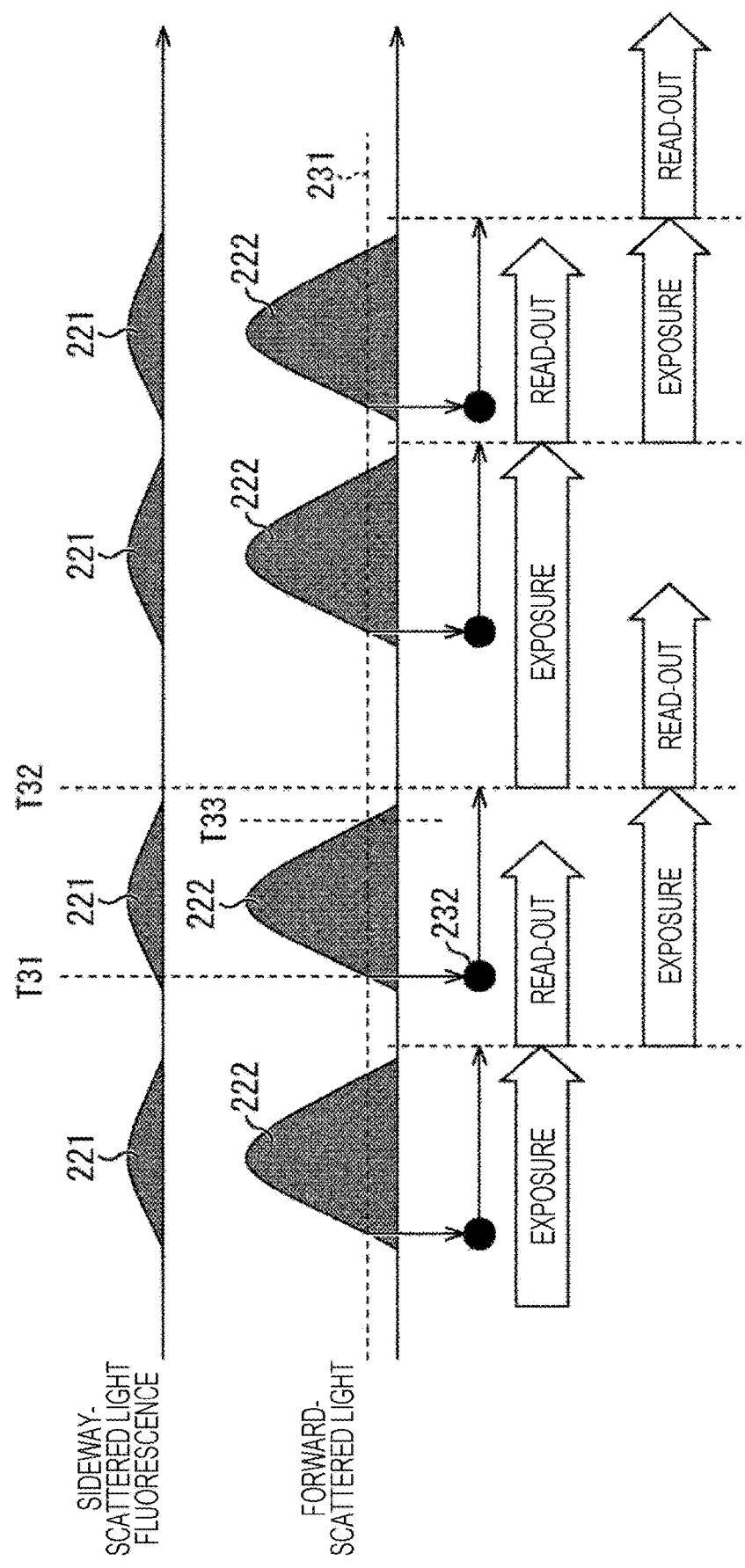
FIG. 31 is a view illustrating a weak-pulse detection state by the optical detector of the flow cytometer.

FIG. 31 illustrates weak pulse detection state by the optical detector 23 of the flow cytometer 200.

When the specimen 203 passes through the irradiation spot 208 of the laser light 207, the intensity of the sideway-scattered light or the fluorescence 206 that is emitted from the fluorescent marker attached to the specimen 203 is shown as a pulse form 221, and each pulse form 221 corresponds to passage of one specimen 203. At this time, the forward-scattered light 205, which is detected by the photodiode 201, shows a pulse form 222 having a similar timing.

The photodiode 201 compares the intensity of the forward-scattered light 205 with a predetermined threshold value 231. At timing T31 at which the intensity of the forward-scattered light 205 is equal to or greater than the threshold value 231, the photodiode 201 detects passage of the specimen 203 and generates an event signal 232.

Completion of exposure and data read-out in the optical detector 23 are executed in synchronization with the event signal 232 relating to passage of the specimen. A data read-out access sequence conforms to FIG. 23 or FIG. 29, and is set to a global shutter in which an insensible period rarely exists. At this time, in-pixel transfer is performed in synchronization with the event signal 232 relating to passage of the specimen, and the exposure period is terminated, and thus read-out is initiated. In addition, the subsequent exposure period simultaneously starts in the entirety of pixels.

That is, the optical detector 23 completes exposure (accumulation) in each of the pixels 41 at timing T32 after the elapse of a constant delay in consideration of a flow rate and a size of the specimen 203 after acquiring the event signal 232, and initiates read-out of an accumulation signal. In addition, the optical detector 23 starts the subsequent exposure (accumulation) at timing T32. A total value of pixel outputs at each read-out sequence corresponds to a total amount of photons which are received by the optical detector 23 for every pulse. According to this, the intensity of the sideway-scattered light or fluorescence for every specimen 203 is derived.

The optical detector 23 has a function of completing accumulation of the entirety of effective pixels at desired timing, and outputting an accumulation signal. In addition, the optical detector 23 initiates the subsequent accumulation immediately after completion of the accumulation.

Furthermore, in this example, the event signal 232 relating to passage of the specimen is generated at timing T31 at which the intensity increases after passing through the threshold value 231, but may be generated at timing T33 at which the intensity decreases after passing through the threshold value 231. In a case where the event signal 232 is generated at the timing T33, there is an advantage that it is easy to correspond to a fluctuation in a size or a flow rate of the specimen 203.

In addition, the event signal 232 may be generated by using the sideway-scattered light and the fluorescence 206. In this case, the sideway-scattered light and the fluorescence 206 may be spectrally dispersed to come into contact with another event generation element, or an event generation element may be additionally mounted in the optical detector 23.

The embodiments of the present technology are not limited to the above-described embodiments, and various modifications can be made in a range not departing from the gist of the present technology.

For example, as an optical pulse detection device, the optical detector 23 may be set as an independent device. In addition to this, the optical detector 23 may be provided as a part of a device other than the radiation counter device 1 or the flow cytometer 200.

It is possible to employ an aspect in which the entirety or parts of the plurality of embodiments are combined.

For example, the present technology may have a cloud computing configuration which processes one function in cooperation with a plurality of devices through one functional network.

In addition, for example, each step described in the above-described flowcharts may be executed in cooperation with a plurality of devices in addition to execution by one device.

In addition, in a case where a plurality of kinds of processing are included in one step, the plurality of kinds of processing included in the one step may be executed in cooperation with a plurality of devices in addition to execution by one device.

In this specification, in a case where the steps described in the flowcharts are performed in a time-series manner or even through the steps are not processed in a time-series manner, the steps may executed in parallel, or may be executed at necessary timing when a call is made, and the like.

Furthermore, the effects described in this specification are illustrative only, and are not limited. Effects other than the effects described in this specification may be present.

Furthermore, the present technology may employ the following configurations.

(1)

An optical pulse detection device, including:

a pixel array unit in which a plurality of pixels are arranged in a two-dimensional lattice shape;

an AD converter that converts output signals of each of the pixels in the pixel array unit into digital values with gradation greater than 1 bit; and a control circuit that performs error determination processing of comparing the digital value with a first threshold value, and discarding a digital value, which is greater than the first threshold value, among the digital values as an error.

(2)

The optical pulse detection device according to (1), in which the control circuit further performs an error determination processing of comparing the digital values with a second threshold value different from the first threshold value, and discarding a digital value, which is smaller than the second threshold value, among the digital values as no signal.

(3)

The optical pulse detection device according to (1), in which the control circuit sums the digital values which are equal to or lower than the first threshold value, and outputs a resultant sum.

(4)

The optical pulse detection device according to (1) or (3), in which the control circuit outputs the sum obtained by summing the digital values equal to or less than the first threshold value after performing correction corresponding to the digital value of a pixel, which is discarded as an error, with respect to the sum.

(5)

The optical pulse detection device according to any one of (1) to (4), in which the control circuit performs the error determination processing with respect to the digital values in a pixel group unit including a plurality of pixels.

(6)

The optical pulse detection device according to any one of (1) to (5), in which the pixel includes:

a charge accumulation unit that accumulates charges which are photo-electrically converted by a photoelectric conversion element;

a reset transistor that resets the charges in the charge accumulation unit; and an output transistor that outputs the charges in the charge accumulation unit as the output signal.

(7)

The optical pulse detection device according to (6), in which the pixel further includes a second reset transistor that is directly connected to the photoelectric conversion element and resets charges of the photoelectric conversion element.

(8)

The optical pulse detection device according to (7), in which the pixel includes a plurality of the second reset transistors.

(9A)

The optical pulse detection device according to any one of (1) to (8), in which the pixel array unit performs initiation and termination of exposure simultaneously in an entirety of pixels.

(9B)

The optical pulse detection device according to any one of (1) to (8) has a lamination structure of a plurality of sheets of semiconductor substrates.

(10)

An optical pulse detection method in an optical pulse detection device including a pixel array unit in which a plurality of pixels are arranged in a two-dimensional lattice shape, an AD converter that converts output signals of each of the pixels in the pixel array unit into digital values with gradation greater than 1 bit, and a control circuit that performs error determination processing of comparing the digital value with a predetermined threshold value, and discarding a digital value, which is greater than the threshold value, among the digital values as an error, the method including:

converting output signals of each of the pixels in the pixel array unit into digital values with gradation greater than 1 bit; and performing error determination processing of comparing the digital value with the predetermined threshold value, and discarding a digital value, which is greater than the threshold value, among the digital values as an error.

(11)

A radiation counter device, including:

the optical pulse detection device according to (1); and a scintillator, in which the optical pulse detection device detects a light-emission pulse that emits light when radiation is incident to the scintillator.

(12)

The radiation counter device according to (11), further including:

a data processing unit that calculates a light-emission pulse counting rate from a number of times of the light-emission pulse that is detected by the optical pulse detection device, and controls an accumulation time of the pixel on the basis of the calculated light-emission pulse counting rate.

(13)

The radiation counter device according to (12), in which in a case where it is determined that the calculated light-emission pulse counting rate is greater than a defined range, the data processing unit changes a sampling rate into a sampling rate in which the accumulation time of the pixel is shorter in comparison to current time.

(14)

The radiation counter device according to (13), in which in a case where it is determined that the calculated light-emission pulse counting rate is greater than the defined range, the data processing unit performs a control so that only parts of pixel rows in the pixel array unit are used to change the sampling rate into a sampling rate in which the accumulation time of the pixel is shorter in comparison to current time.

(15)

The radiation counter device according to (12), in which in a case where it is determined that the calculated light-emission pulse counting rate is greater than a first counting rate, and is equal to or less than a second counting rate, the data processing unit calculates an average number of times of light-emission from the calculated light-emission pulse counting rate, and derives an amount of radiation.

(16)

The radiation counter device according to (15), in which in a case where it is determined that the calculated light-emission pulse counting rate is greater than the second counting rate, the data processing unit derives an integrated amount of radiation.

(17)

The radiation counter device according to (12), in which in a case where an output signal in a read-out unit is greater than a defined determination threshold value, the data processing unit makes a determination as initiation of output of the light-emission pulse, and derives a quantity of light of the light-emission pulse.

(18)

The radiation counter device according to any one of (11) to (17), in which the scintillator includes a scintillator array in which a plurality of optically separated scintillators are arranged, and the pixel array unit includes light-receiving regions corresponding to the plurality of scintillators.

(19)

The radiation counter device according to (18), in which the pixel array unit includes a light-shielding unit between the light-receiving regions corresponding to the plurality of scintillators.

(20)

A biological testing device, including:

the optical pulse detection device according to (1), in which the optical pulse detection device detects fluorescence or scattered light which is excited when a specimen in a fluid is irradiated with laser light.

REFERENCE SIGNS LIST

1 Radiation counter device
11 Light-receiving unit
12 Data processing unit
21 Scintillator
23 Optical detector
41 Pixel
51 Pixel array unit
52 Detection circuit
54 Row drive circuit
57 Output control circuit
71 Photodiode
72 Accumulation node
73 Transfer transistor
74 Amplification transistor
75 Reset transistor
76 Detection node
77 Selection transistor
91 AD converter
101 Comparator
104 Adder
105 Sum signal register
106 Signal correction unit
121 Scintillator array
122 Region
123 Light-shielding unit
141 Upper substrate
142 Lower substrate
181 Second reset transistor
200 Flow cytometer 201 Photodiode
202 Sample tube
203 Specimen
206 Fluorescence
209 Laser light source

The invention claimed is:

1. An optical pulse detection device, comprising:
a pixel array unit in which a plurality of pixels are arranged in a two-dimensional lattice shape and are configured to detect optical pulses;
an analog-to-digital converter configured to convert output signals of each of the pixels in the pixel array unit into digital values with gradation greater than 1 bit, each of the digital values representing an optical pulse detected by one of the plurality of pixels; and
a control circuit configured to perform error determination processing of comparing each of the digital values with a first threshold value, and discarding a digital value of the digital values, which is greater than the first threshold value, as an error,
wherein each of the pixels includes:
a charge accumulation unit configured to accumulate charges which are photo-electrically converted by a photoelectric conversion element;
a reset transistor configured to reset the charges in the charge accumulation unit;
an output transistor configured to output the charges in the charge accumulation unit as the output signal; and
a second reset transistor that is directly connected to the photoelectric conversion element and is configured to reset charges of the photoelectric conversion element.

2. The optical pulse detection device according to claim 1, wherein the control circuit is further configured to perform error determination processing of comparing each of the digital values with a second threshold value different from the first threshold value, and discarding a digital value of the digital values, which is smaller than the second threshold value, as no signal.

3. The optical pulse detection device according to claim 1, wherein the control circuit is configured to sum the digital values which are equal to or lower than the first threshold value, and to output a resultant sum.

4. The optical pulse detection device according to claim 1, wherein the control circuit is configured to output the sum obtained by summing the digital values equal to or less than the first threshold value after performing correction.

5. The optical pulse detection device according to claim 1, wherein the control circuit is configured to perform the error determination processing with respect to the digital values in a pixel group.

6. The optical pulse detection device according to claim 1, wherein each of the pixels includes a plurality of second reset transistors.

7. The optical pulse detection device according to claim 1, wherein the pixel array unit is configured to perform initiation and termination of exposure simultaneously in an entirety of pixels.

8. A radiation counter device, comprising:
the optical pulse detection device according to claim 1; and
a scintillator,
wherein the optical pulse detection device detects an optical pulse when radiation is incident to the scintillator.

9. The radiation counter device according to claim 8, further comprising:
a data processing unit configured to calculate an optical pulse counting rate from a number of times that the optical pulse is detected by the optical pulse detection device, and to control an accumulation time of the pixel on the basis of the calculated optical pulse counting rate.

10. The radiation counter device according to claim 9, wherein, when it is determined that the calculated optical pulse counting rate is greater than a defined range, the data processing unit is configured to change a sampling rate into a sampling rate in which the accumulation time of the pixel is shorter in comparison to current time.

11. The radiation counter device according to claim 10, wherein, when it is determined that the calculated optical pulse counting rate is greater than the defined range, the data processing unit is configured to perform a control so that only parts of pixel rows in the pixel array unit are used to change the sampling rate into a sampling rate in which the accumulation time of the pixel is shorter in comparison to current time.

12. The radiation counter device according to claim 9, wherein, when it is determined that the calculated optical pulse counting rate is greater than a first counting rate, and is equal to or less than a second counting rate, the data processing unit is configured to calculate an average number of times of light-emission from the calculated optical pulse counting rate, and to derive an amount of radiation.

13. The radiation counter device according to claim 12, wherein, when it is determined that the calculated optical pulse counting rate is greater than the second counting rate, the data processing unit is configured to derive an integrated amount of radiation.

14. The radiation counter device according to claim 9, wherein, when an output signal in a read-out unit is greater than a defined determination threshold value, the data processing unit is configured to make a determination as initiation of output of the optical pulse, and to derive a quantity of light of the optical pulse.

15. The radiation counter device according to claim 8, wherein the scintillator includes a scintillator array in which a plurality of optically separated scintillators are arranged, and
the pixel array unit includes light-receiving regions corresponding to the plurality of scintillators.

16. The radiation counter device according to claim 15, wherein the pixel array unit includes a light-shielding unit between the light-receiving regions corresponding to the plurality of scintillators.

17. A biological testing device, comprising:
the optical pulse detection device according to claim 1,
wherein the optical pulse detection device is configured to detect fluorescence or scattered light which is excited when a specimen in a fluid is irradiated with laser light.

18. An optical pulse detection method in an optical pulse detection device including a pixel array unit in which a plurality of pixels are arranged in a two-dimensional lattice shape and are configured to detect optical pulses, an analog-to-digital converter, and a control circuit, the method comprising:
converting, by the analog-to-digital converter, output signals of each of the pixels in the pixel array unit into digital values with gradation greater than 1 bit, each of the digital values representing an optical pulse detected by one of the plurality of pixels; and performing, by the control circuit, error determination processing of comparing each of the digital values with the predetermined threshold value, and discarding a digital value of the digital values, which is greater than the threshold value, as an error, wherein each of the pixels includes:

a charge accumulation unit configured to accumulate charges which are photo-electrically converted by a photoelectric conversion element;

a reset transistor configured to reset the charges in the charge accumulation unit;

an output transistor configured to output the charges in the charge accumulation unit as the output signal; and a second reset transistor that is directly connected to the photoelectric conversion element and is configured to reset charges of the photoelectric conversion element.

* * * * *